United States Patent
Nishimura et al.

(10) Patent No.: US 12,436,737 B2
(45) Date of Patent: Oct. 7, 2025

(54) NOTIFICATION MANAGEMENT DEVICE, NOTIFICATION SYSTEM, CONTROL METHOD OF NOTIFICATION MANAGEMENT DEVICE, AND RECORDING MEDIUM

(71) Applicant: Panasonic Intellectual Property Management Co., Ltd., Osaka (JP)

(72) Inventors: Ryo Nishimura, Osaka (JP); Yoichi Ikeda, Hyogo (JP); Kazuhiro Kuroyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/576,723

(22) PCT Filed: Mar. 20, 2023

(86) PCT No.: PCT/JP2023/010987
§ 371 (c)(1),
(2) Date: Jan. 4, 2024

(87) PCT Pub. No.: WO2023/189849
PCT Pub. Date: Oct. 5, 2023

(65) Prior Publication Data
US 2024/0319960 A1    Sep. 26, 2024

(30) Foreign Application Priority Data
Mar. 28, 2022    (JP) .................................. 2022-051968

(51) Int. Cl.
*G06F 3/16* (2006.01)
*H04L 67/55* (2022.01)

(52) U.S. Cl.
CPC .............. *G06F 3/167* (2013.01); *H04L 67/55* (2022.05)

(58) Field of Classification Search
CPC . G06F 3/167; G06F 3/16; H04L 67/55; H04L 12/28; G06Q 30/0201; G06Q 30/0251; H04M 11/00
See application file for complete search history.

(56) References Cited

U.S. PATENT DOCUMENTS

| | | | |
|---|---|---|---|
| 2012/0041825 A1 | 2/2012 | Kasargod et al. | |
| 2015/0254724 A1* | 9/2015 | Kusukame | G06Q 30/0251 705/14.58 |
| 2015/0348554 A1* | 12/2015 | Orr | G10L 17/22 |

FOREIGN PATENT DOCUMENTS

| | | |
|---|---|---|
| EP | 3105640 B1 | 2/2021 |
| JP | 5955374 A | 7/2016 |

OTHER PUBLICATIONS

Extended European Search Report dated Feb. 17, 2025 issued in the corresponding European Patent Application No. 23779865.7.

(Continued)

*Primary Examiner* — Phuong H Nguyen
(74) *Attorney, Agent, or Firm* — Rimon P.C.

(57) ABSTRACT

A notification management device includes: an operation log obtainer that obtains an operation log indicating a state of an information source appliance operated by a user, from the information source appliance; an operation log storage that stores the operation log obtained by the operation log obtainer; a setting content information storage that stores setting content information indicating setting content of a voice notification of an utterance appliance set by the user; a voice notification log storage that stores a voice notification log indicating a history of the voice notification output by the utterance appliance based on the setting content; an estimator that estimates the user's interest based on at least (Continued)

one of the operation log, the setting content information, or the voice notification log; and a push notification transmitter that transmits, to a terminal device, a push notification for notifying the user of notification content related to the estimated interest.

14 Claims, 17 Drawing Sheets

(56) References Cited

OTHER PUBLICATIONS

International Search Report (ISR) issued on Jun. 13, 2023 in International (PCT) Application No. PCT/JP2023/010987 w/English Translation.

* cited by examiner

FIG. 3

| Operation log/Setting content of voice notification/Voice notification log | Notification content of push notification marked as read | Interest of user | Notification content of push notification related to interest of user |
|---|---|---|---|
| - Operation log of washing machine: Sterilization mode use ≥ 1 time/week<br>- Setting content of voice notification: Low water tank remaining amount of humidifying air purifier = ON<br>- Voice notification log: Utterance of water tank remaining amount ≥ 1 time/month (November to March) | Living room cleaning tips | Cleanliness of surroundings | - Cleaning<br>- Air (pollen/PM2.5)<br>- Indoor environment (mold/dust) |
| - Operation log of recorder: Recording/viewing of cooking program ≥ 1 time/week<br>- Setting content of voice notification: Voice notification of microwave oven and rice cooker: ON<br>- Voice notification log: Utterance of microwave oven and rice cooker: ≥ 1 time/day | Cooking tips | Cooking | - Kitchen (cooking appliances/cooking utensils)<br>- Cooking (recipes/ingredients) |
| - Operation log of air conditioner: ON/OFF frequency ≥ 3 times/day<br>- Setting content of voice notification: Low automatically dispensed detergent remaining amount of washing machine = ON<br>- Voice notification log: Utterance of detergent remaining amount ≤ 1 time/month | Money saving tips | Money saving | - Money saving technique<br>- Discount campaign |
| ... | ... | ... | ... |

| Operation log/Setting content of voice notification/Voice notification log | Notification content of push notification marked as read | Questionnaire answer | Interest of user | Notification content of push notification related to interest of user |
|---|---|---|---|---|
| - Operation log of washing machine: Sterilization mode use ≥ 1 time/week<br>- Setting content of voice notification: Low water tank remaining amount of humidifying air purifier = ON<br>- Voice notification log: Utterance of water tank remaining amount ≥ 1 time/month (November to March) | Living room cleaning tips | - Interested in cleaning<br>- Interested in laundry | Cleanliness of surroundings | - Cleaning<br>- Air (pollen/PM2.5)<br>- Indoor environment (mold/dust) |
| ... | ... | ... | ... | ... |

| | | Use setting content information to estimate interest | | Not use setting content information to estimate interest |
|---|---|---|---|---|
| | | Voice notification output ON | Voice notification output OFF | |
| There is transmission history of push notification | Read | Voice notification + push notification (case 1) | Push notification (case 4) | Voice notification + push notification (case 7) |
| | Unread | Voice notification (case 2) | No notification (case 5) | Voice notification (case 8) |
| There is no transmission history of push notification | | Voice notification + push notification (case 3) | Push notification (case 6) | Push notification (case 9) |

NOTIFICATION MANAGEMENT DEVICE, NOTIFICATION SYSTEM, CONTROL METHOD OF NOTIFICATION MANAGEMENT DEVICE, AND RECORDING MEDIUM

CROSS-REFERENCE TO RELATED APPLICATIONS

This application is the U.S. National Phase under 35 U.S.C. § 371 of International Application No. PCT/JP2023/010987, filed on Mar. 20, 2023, which claims the benefit of foreign priority to Japanese Patent Application No. 2022-051968, filed on Mar. 28, 2022, the entire contents of each of which are hereby incorporated by reference.

TECHNICAL FIELD

The present disclosure relates to a notification management device, a notification system, a control method of a notification management device, and recording medium.

BACKGROUND ART

There is a known technology of transmitting push notifications for notifying users of notification content such as various guidance and advertisements to smartphones owned by the users (for example, see Patent Literature (PTL) 1).

CITATION LIST

Patent Literature

[PTL 1]
Japanese Patent No. 5955374

SUMMARY OF INVENTION

Technical Problem

The present disclosure provides a notification management device, a notification system, a control method of a notification management device, and a recording medium that can notify a user of useful notification content.

Solution to Problem

A notification management device according to the present disclosure is a notification management device that communicates, via a network, with each of a terminal device, a first appliance, and a second appliance that outputs a voice notification to a user, the notification management device including: a first obtainer that obtains appliance state information indicating a state of the first appliance operated by the user, from the first appliance; a first storage that stores the appliance state information obtained by the first obtainer; a second storage that stores setting content information indicating setting content of the voice notification of the second appliance set by the user; a third storage that stores voice notification history information indicating a history of the voice notification output by the second appliance based on the setting content; an estimator that estimates an interest of the user based on at least one of the appliance state information, the setting content information, or the voice notification history information; and a notifier that transmits, to the terminal device, a push notification for notifying the user of notification content related to the interest of the user estimated by the estimator.

Advantageous Effects of Invention

With the notification management device, etc. according to the present disclosure, a user can be notified of useful notification content.

BRIEF DESCRIPTION OF DRAWINGS

FIG. 3 is a diagram illustrating an example of correspondence information according to Embodiment 1.

FIG. 10 is a diagram illustrating an example of correspondence information according to Embodiment 3.

FIG. 13 is a diagram illustrating an example of a selection table according to Embodiment 4.

DESCRIPTION OF EMBODIMENTS (Underlying Knowledge Forming Basis of the Present Disclosure)

The present inventors have found the following problem with the technology described in the "Background Art" section.

With the conventional technology described above, a user is annoyed if push notifications of notification content that is of little interest to the user are transmitted to the user's smartphone many times.

Upon careful examination, the present inventors have invented a notification management device, a notification system, a control method of a notification management device, and a program that can notify a user of useful notification content.

Embodiments will be described in detail below, by referring to drawings as appropriate. Herein, description detailed more than necessary may be omitted. For example, detailed description of well-known matters or repeated description of the substantially same structures may be omitted. This is to avoid unnecessarily redundant description and facilitate the understanding of a person skilled in the art.

The accompanying drawings and the following description are provided to help a person skilled in the art to fully understand the present disclosure, and are not intended to limit the subject matter defined in the appended claims.

Embodiment 1

Embodiment 1 will be described below with reference to FIGS. 1 to 5.

[1-1. Overview of Notification System]

Figure 1:
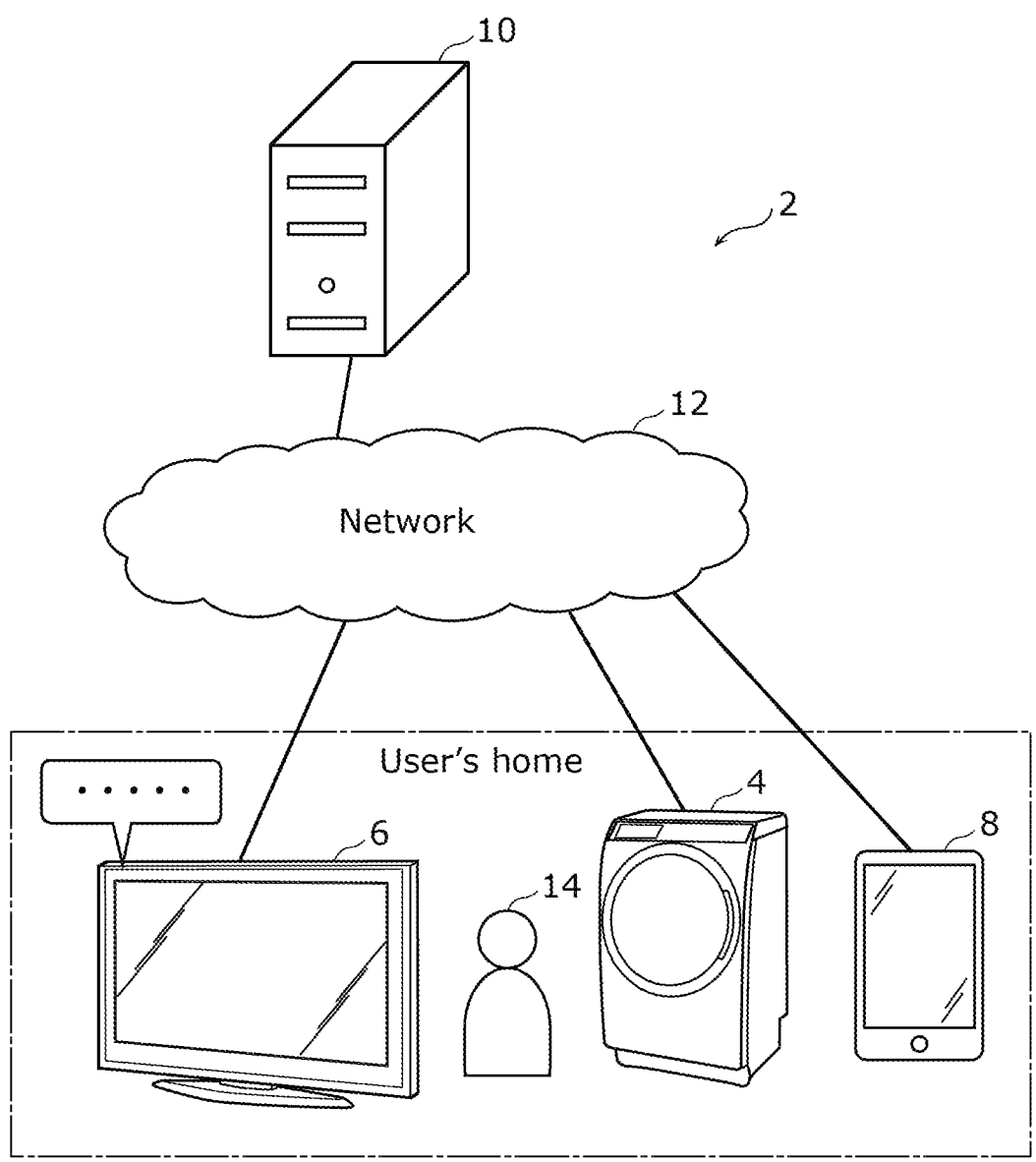
FIG. 1 is a diagram illustrating an overview of a notification system according to Embodiment 1.

First, an overview of notification system 2 according to Embodiment 1 will be described with reference to FIG. 1. FIG. 1 is a diagram illustrating an overview of notification system 2 according to Embodiment 1.

As illustrated in FIG. 1, notification system 2 includes information source appliance 4 (an example of a first appliance), utterance appliance 6 (an example of a second appliance), terminal device 8, and notification management device 10. Notification management device 10 is capable of communicating with each of information source appliance 4, utterance appliance 6, and terminal device 8 via network 12. Network 12 is, for example, the Internet. Information source appliance 4 and utterance appliance 6 are Installed, for example, in the home of user 14.

Information source appliance 4 is a home appliance operated by user 14, such as a washing machine. When the state of information source appliance 4 changes (for example, the automatically dispensed detergent remaining amount of the washing machine has decreased to a predetermined amount or less), information source appliance 4 transmits an operation log (an example of appliance state information) indicating the change in the state of information source appliance 4 to notification management device 10.

Although only one information source appliance 4, i.e. a washing machine, is illustrated in FIG. 1 for convenience of explanation, it is assumed that a plurality of information source appliances such as an air conditioner, a microwave oven, a refrigerator, a rice cooker, a recorder (recording appliance), a robot vacuum cleaner, and a humidifying air cleaner are installed in the home of user 14 and connected to network 12.

Utterance appliance 6 is a home appliance that is operated by user 14 and has an utterance function of uttering voices, and is, for example, a television receiver. Utterance appliance 6 receives a voice notification from notification management device 10, and outputs the received voice notification from a speaker. Although this embodiment describes the case where utterance appliance 6 is a television receiver, the present disclosure is not limited to such, and utterance appliance 6 may be any home appliance equipped with a speaker, such as a robot vacuum cleaner.

By operating a voice notification setting screen displayed on utterance appliance 6, user 14 can set ON/OFF of voice notification output for each notification content of voice notification. For example, in the case where user 14 sets output of a voice notification of notification content "low automatically dispensed detergent remaining amount of washing machine" ON, utterance appliance 6 outputs a voice notification of notification content "The automatically dispensed detergent remaining amount of the washing machine is low." at the timing when the automatically dispensed detergent remaining amount of the washing machine (information source appliance 4) has decreased to a predetermined amount or less. In the case where user 14 sets output of a voice notification of notification content "low automatically dispensed detergent remaining amount of washing machine" OFF, on the other hand, utterance appliance 6 does not output the voice notification of the notification content even when the automatically dispensed detergent remaining amount of the washing machine (information source appliance 4) has decreased to the predetermined amount or less. Setting content information indicating the setting content of ON/OFF of voice notification output set by user 14 is stored in notification management device 10.

Terminal device 8 is a mobile terminal operated by user 14, and is, for example, a smartphone or a tablet. Terminal device 8 is used inside or outside the home of user 14. An application dedicated to notification system 2 is installed on terminal device 8, Terminal device 8 receives a push notification from notification management device 10 and displays the received push notification, by the function of the application. When user 14 taps the push notification displayed on terminal device 8, the notification content of the push notification is marked as read.

Notification management device 10 is a server device for controlling voice notifications output from utterance appliance 6 and push notifications displayed on terminal device 8. Notification management device 10 obtains (receives) an operation log from information source appliance 4 and stores the obtained operation log. Notification management device 10 also stores setting content information indicating the setting content of ON/OFF of voice notification output set by user 14.

Notification management device 10 transmits a voice notification to utterance appliance 6 based on the operation log and the setting content information. For example, in the case where user 14 sets output of a voice notification of notification content "low automatically dispensed detergent remaining amount of washing machine" ON, notification management device 10 transmits a voice notification of notification content "The automatically dispensed detergent remaining amount of the washing machine is low." to utterance appliance 6 at the timing when the automatically dispensed detergent remaining amount of the washing machine (information source appliance 4) has decreased to the predetermined amount or less.

In addition, notification management device 10 stores a voice notification log (an example of voice notification history information) indicating the history of voice notification output by utterance appliance 6 based on the setting content information. Notification management device 10 also stores already-read information indicating that the notification content of the push notification is marked as read by user 14.

Notification management device 10 estimates an interest of user 14 based on the operation log, the setting content information, the voice notification log, and the already-read information. Notification management device 10 then transmits a push notification for notifying user 14 of notification content related to the estimated interest of user 14, to terminal device 8.

[1-2. Functional Structure of Notification System]

Figure 2:
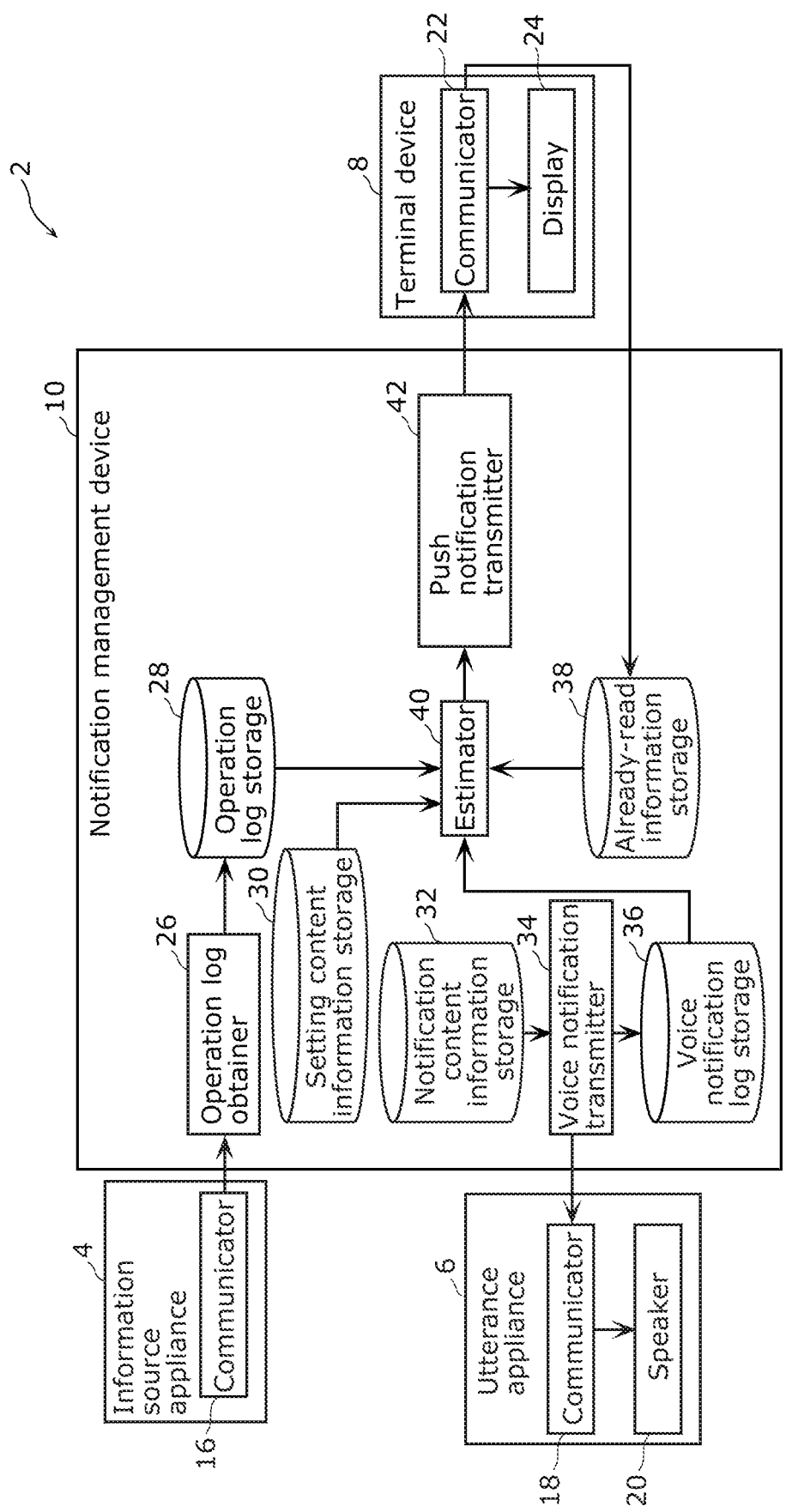
FIG. 2 is a block diagram illustrating the functional structure of the notification system according to Embodiment 1.

The functional structure of notification system 2 according to Embodiment 1 will be described below with reference to FIGS. 2 and 3. FIG. 2 is a block diagram Illustrating the functional structure of notification system 2 according to Embodiment 1. FIG. 3 is a diagram illustrating an example of correspondence information 44 according to Embodiment 1.

As illustrated in FIG. 2, information source appliance 4 includes communicator 16 (an example of a first communicator). When the state of information source appliance 4 changes, communicator 16 transmits an operation log indicating the change in the state of information source appliance 4 to notification management device 10. For example, communicator 16 transmits an operation log to notification management device 10 at predetermined time intervals. The operation log includes information indicating a change in the state of information source appliance 4 (for example, the automatically dispensed detergent remaining amount of the washing machine has decreased to the predetermined amount or less) and the date and time when the state of information source appliance 4 changed. Only one information source appliance 4 is illustrated in FIG. 2 for convenience of explanation.

Utterance appliance 6 includes communicator 18 and speaker 20 (an example of an outputter), Communicator 18 receives a voice notification from notification management device 10. Speaker 20 outputs the voice notification received by communicator 18.

Terminal device 8 includes communicator 22 (an example of a second communicator) and display 24. Communicator 22 receives a push notification from notification management device 10. When the notification content of the push notification is marked as read by user 14, communicator 22 transmits already-read information indicating that the notification content of the push notification is marked as read to notification management device 10. Display 24 is, for example, a touch panel display, and displays the push notification received by communicator 22.

Notification management device 10 includes operation log obtainer 26 (an example of an obtainer and a first obtainer), operation log storage 28 (an example of a first storage), setting content Information storage 30 (an example of a second storage), notification content information storage 32, voice notification transmitter 34, voice notification log storage 36 (an example of a third storage), already-read information storage 38 (an example of a fifth storage), estimator 40, and push notification transmitter 42 (an example of a notifier).

Operation log obtainer 26 obtains an operation log from information source appliance 4.

Operation log storage 28 stores the operation log obtained by operation log obtainer 26.

Setting content information storage 30 stores setting content Information indicating the setting content of ON/OFF of voice notification output set by user 14. For example, the setting content information is obtained from utterance appliance 6 via network 12.

Notification content information storage 32 stores a plurality of items of notification content information each indicating notification content (for example, notification content "The automatically dispensed detergent remaining amount of the washing machine has decreased to the predetermined amount or less") of a voice notification.

Voice notification transmitter 34 transmits a voice notification of notification content indicated by notification content information stored in notification content information storage 32 to utterance appliance 6, based on the operation log obtained by operation log obtainer 26 and the setting content information stored in setting content information storage 30. For example, in the case where user 14 sets output of a voice notification of notification content "low automatically dispensed detergent remaining amount of washing machine" ON, notification management device 10 reads notification content information of notification content "The automatically dispensed detergent remaining amount of the washing machine is low." from notification content information storage 32 and transmits a voice notification to utterance appliance 6 based on the read notification content information, at the timing when the automatically dispensed detergent remaining amount of the washing machine (information source appliance 4) has decreased to the predetermined amount or less.

Voice notification log storage 36 stores a voice notification log indicating the history of voice notification transmitted by voice notification transmitter 34 (that is, output by utterance appliance 6 based on the setting content information). The voice notification log Includes information indicating the notification content of the voice notification and the date and time when the voice notification was output from utterance appliance 6.

Already-read information storage 38 stores already-read information from terminal device 8.

Estimator 40 estimates an interest of user 14 by referring to correspondence information 44 based on the operation log stored in operation log storage 28, the setting content information stored in setting content information storage 30, the voice notification log stored in voice notification log storage 36, and the already-read Information stored in already-read information storage 38.

Correspondence information 44 is, for example, a data table illustrated in FIG. 3. As illustrated in FIG. 3, correspondence information 44 is information indicating the correspondence relationship between operation logs, setting contents (setting content Information) of voice notifications, voice notification logs, notification contents of push notifications marked as read (already-read information), interests of user 14, and notification contents of push notifications related to the interests of user 14.

In the example illustrated in FIG. 3, the first row of correspondence information 44 includes a) operation log of washing machine (information source appliance 4) "sterilization mode use ≥1 time/week", b) setting content of voice notification "low water tank remaining amount of humidifying air purifier (information source appliance 4)=ON", c) voice notification log "utterance of water tank remaining amount ≥1 time/month (November to March)", d) notification content of push notification marked as read "living room cleaning tips", e) interest of user 14 "cleanliness of surroundings", and f) notification content of push notification related to interest of user 14 "cleaning", "air (pollen/PM2.5)", and "indoor environment (mold/dust)".

In detail, the first row of correspondence information 44 means the following: In the case where i) user 14 uses the sterilization mode operation of the washing machine (information source appliance 4) at least once a week, ii) user 14 sets output of a voice notification of notification content "low water tank remaining amount of humidifying air purifier (information source appliance 4)" ON, iii) utterance appliance 6 outputs a voice notification of notification content "The water tank remaining amount of the humidifying air purifier (information source appliance 4) is low." at least once a month (November to March), and iv) user 14 marked notification content of a push notification "living room cleaning tips" as read in the past, the interest of user 14 is estimated to be "cleanliness of surroundings", and notification contents of push notifications related to the interest of user 14 are "cleaning", "air (pollen/PM2.5)", and "indoor environment (mold/dust)".

In correspondence information 44 illustrated in FIG. 3, notification contents of push notifications related to the interest of user 14 are simplified, such as "cleaning", Actually, however, the notification content "cleaning" includes the text "Guide to useful information for cleaning." and the URL (Uniform Resource Locator) of a website for mail order sales of cleaning supplies, for example.

Push notification transmitter 42 reads notification content of a push notification related to the interest of user 14 estimated by estimator 40 from correspondence information 44, and transmits the push notification of the read notification content to terminal device 8.

[1-3. Operation of Notification Management Device]

Figure 4:
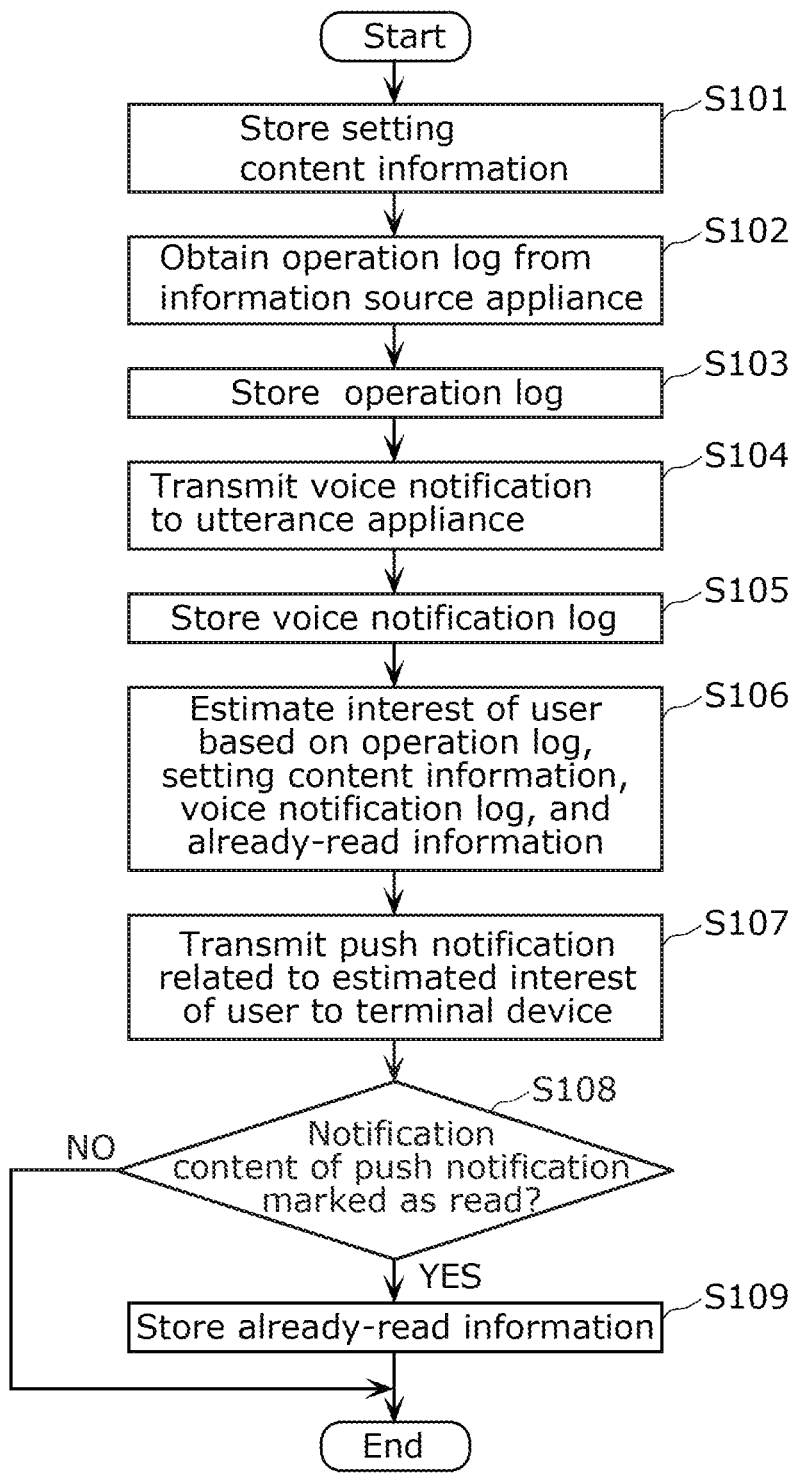
FIG. 4 is a flowchart illustrating the flow of operation of a notification management device according to Embodiment 1.
Figure 5:
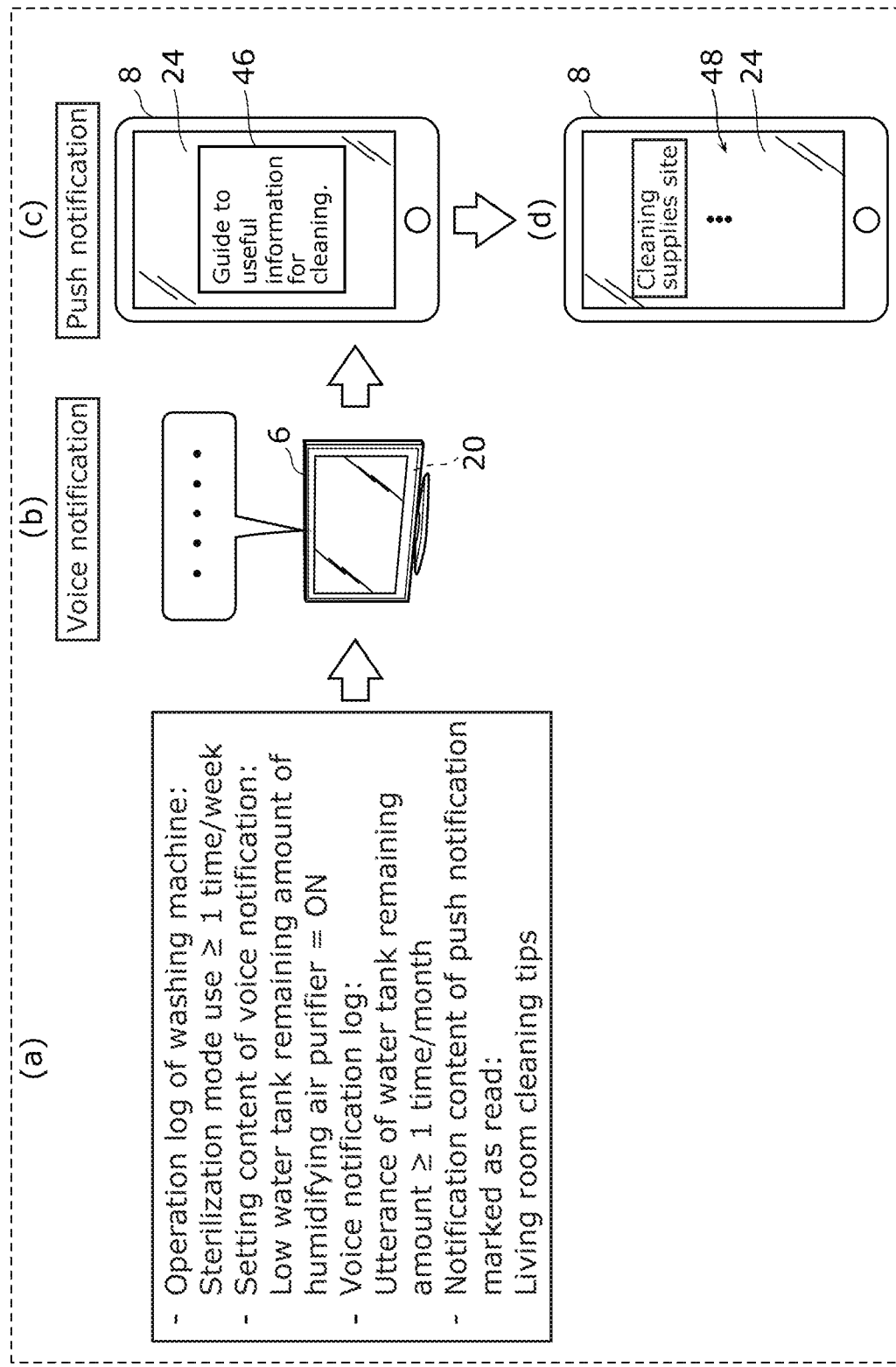
FIG. 5 is a diagram for explaining the operation of the notification management device according to Embodiment 1.

The operation of notification management device 10 according to Embodiment 1 will be described below with reference to FIGS. 4 and 5. FIG. 4 is a flowchart illustrating the flow of operation of notification management device 10 according to Embodiment 1. FIG. 5 is a diagram for explaining the operation of notification management device 10 according to Embodiment 1.

As illustrated in FIG. 4, first, setting content information storage 30 stores setting content information indicating the setting content of ON/OFF of voice notification output set by user 14 (S101). Next, operation log obtainer 26 obtains an operation log from information source appliance 4 (S102), and operation log storage 28 stores the operation log obtained by operation log obtainer 26 (S103).

Voice notification transmitter 34 transmits a voice notification of notification content indicated by notification content information stored in notification content information storage 32, based on the operation log obtained by operation log obtainer 26 and the setting content information stored in setting content information storage 30 (S104). Consequently, speaker 20 in utterance appliance 6 outputs the voice notification from notification management device 10, as Illustrated in (b) in FIG. 5. Voice notification log storage 36 stores a voice notification log indicating the history of the voice notification transmitted by voice notification transmitter 34 (S105).

Estimator 40 estimates an interest of user 14 by referring to correspondence information 44, based on the operation log stored in operation log storage 28, the setting content information stored in setting content information storage 30, the voice notification log stored in voice notification log storage 36, and already-read information stored in already-read information storage 38 (S106).

In this embodiment, for example, suppose the operation log of the washing machine (information source appliance 4) is "sterilization mode use ≥1 time/week", the setting content information is "low water tank remaining amount of humidifying air purifier (information source appliance 4)=ON", the voice notification log is "utterance of water tank remaining amount ≥1 time/month (November to March)", and the already-read information is "living room cleaning tips", as illustrated in (a) in FIG. 5. In this case, estimator 40 estimates that the interest of user 14 corresponding to the foregoing operation log, setting content information, voice notification log, and already-read information is "cleanliness of surroundings", by referring to correspondence information 44.

Push notification transmitter 42 reads notification content of a push notification related to the interest of user 14 estimated by estimator 40 from correspondence information 44, and transmits the push notification of the read notification content to terminal device 8 (S107).

For example, in the case where estimator 40 estimates that the Interest of user 14 is "cleanliness of surroundings", push notification transmitter 42 reads "cleaning" as notification content of push notification related to the interest of user 14 "cleanliness of surroundings" from correspondence information 44. Push notification transmitter 42 then transmits a push notification of the notification content "cleaning" to terminal device 8.

Consequently, for example, push notification 46 including the text "Guide to useful information for cleaning." is displayed on display 24 in terminal device 8, as illustrated in (c) in FIG. 5. Since user 14 is estimated to be highly interested in cleaning, there is a high possibility that user 14 is interested in push notification 46. In the case where user 14 taps push notification 46, for example, top page 48 of a mail order website of cleaning supplies is displayed on display 24 in terminal device 8, as illustrated in (d) in FIG. 5. Hence, the notification content of push notification 46 is marked as read by user 14.

In the case where the notification content of push notification 46 is marked as read by user 14 (S108: YES), communicator 22 in terminal device 8 transmits already-read information to notification management device 10. Already-read information storage 38 stores the already-read information from terminal device 8 (S109). The flowchart in FIG. 4 then ends.

For example, in the case where user 14 does not tap push notification 46 and the notification content of push notification 46 is not marked as read by user 14 in Step S108 (S108: NO), the flowchart in FIG. 4 ends.

[1-4. Effects]

In this embodiment, notification management device 10 is a device that communicates, via network 12, with each of terminal device 8, information source appliance 4, and utterance appliance 6 that outputs a voice notification to user 14. Notification management device 10 includes: operation log obtainer 26 that obtains an operation log indicating a state of information source appliance 4 operated by user 14, from information source appliance 4; operation log storage 28 that stores the operation log obtained by operation log obtainer 26; setting content information storage 30 that stores setting content information indicating setting content of the voice notification of utterance appliance 6 set by user 14; voice notification log storage 36 that stores a voice notification log indicating a history of the voice notification output by utterance appliance 6 based on the setting content; estimator 40 that estimates an interest of user 14 based on at least one of the operation log, the setting content information, or the voice notification log; and push notification transmitter 42 that transmits push notification 46 for notifying user 14 of notification content related to the interest of user 14 estimated by estimator 40, to terminal device 8.

With this, estimator 40 estimates the interest of user 14 based on at least one of the operation log, the setting content information, or the voice notification log. Push notification transmitter 42 then transmits push notification 46 of the notification content related to the interest of user 14 estimated by estimator 40 to terminal device 8. Thus, user 14 can be notified of useful notification content.

In this embodiment, notification management device 10 further includes already-read information storage 38 that stores already-read Information indicating that the notification content of push notification 46 is marked as read by user 14. Estimator 40 estimates the interest of user 14 based on the operation log, the setting content information, the voice notification log, and the already-read information.

With this, the interest of user 14 can be estimated more accurately.

In this embodiment, estimator 40 estimates the interest of user 14 by referring to correspondence information 44 indicating a correspondence relationship between the operation log, the setting content information, the voice notification log, and the interest of user 14, based on the operation log, the setting content information, and the voice notification log.

With this, the interest of user 14 can be estimated easily.

In this embodiment, notification system 2 includes: terminal device 8; information source appliance 4; utterance appliance 6; and notification management device 10 that communicates with terminal device 8, information source appliance 4, and utterance appliance 6 via network 12. Information source appliance 4 includes communicator 16 that transmits an operation log indicating a state of information source appliance 4 operated by user 14, to notification management device 10. Utterance appliance 6 includes speaker 20 that outputs a voice notification to user 14. Notification management device 10 includes: operation log obtainer 26 that obtains the operation log from information source appliance 4; operation log storage 28 that stores the operation log obtained by operation log obtainer 26; setting content information storage 30 that stores setting content information indicating setting content of the voice notification of utterance appliance 6 set by user 14; voice notification log storage 36 that stores a voice notification log Indicating a history of the voice notification output by utterance appliance 6 based on the setting content; estimator 40 that estimates an interest of user 14 based on at least one of the operation log, the setting content information, or the voice notification log; and push notification transmitter 42 that transmits push notification 46 for notifying user 14 of notification content related to the interest of user 14 estimated by estimator 40, to terminal device 8. Terminal device 8 includes: communicator 22 that receives push notification 46 from notification management device 10; and display 24 that displays push notification 46 received by communicator 22.

With this, user 14 can be notified of useful notification content as mentioned above.

In this embodiment, a control method is a control method of notification management device 10 that communicates, via network 12, with each of terminal device 8, information source appliance 4, and utterance appliance 6 that outputs a voice notification to user 14. The control method of notification management device 10 includes: (a) obtaining an operation log indicating a state of information source appliance 4 operated by user 14, from information source appliance 4; (b) storing the operation log obtained in (a), in operation log storage 28; (c) storing setting content information indicating setting content of the voice notification of utterance appliance 6 set by user 14, in setting content information storage 30; (d) storing a voice notification log indicating a history of the voice notification output by utterance appliance 6 based on the setting content, in voice notification log storage 36; (e) estimating an interest of user 14 based on at least one of the operation log, the setting content information, or the voice notification log; and (f) transmitting push notification 46 for notifying user 14 of notification content related to the interest of user 14 estimated in (e), to terminal device 8.

With this, user 14 can be notified of useful notification content as mentioned above.

In this embodiment, a program causes a computer to execute the foregoing control method of notification management device 10.

Embodiment 2

[2-1. Functional Structure of Notification System]

Figure 6:
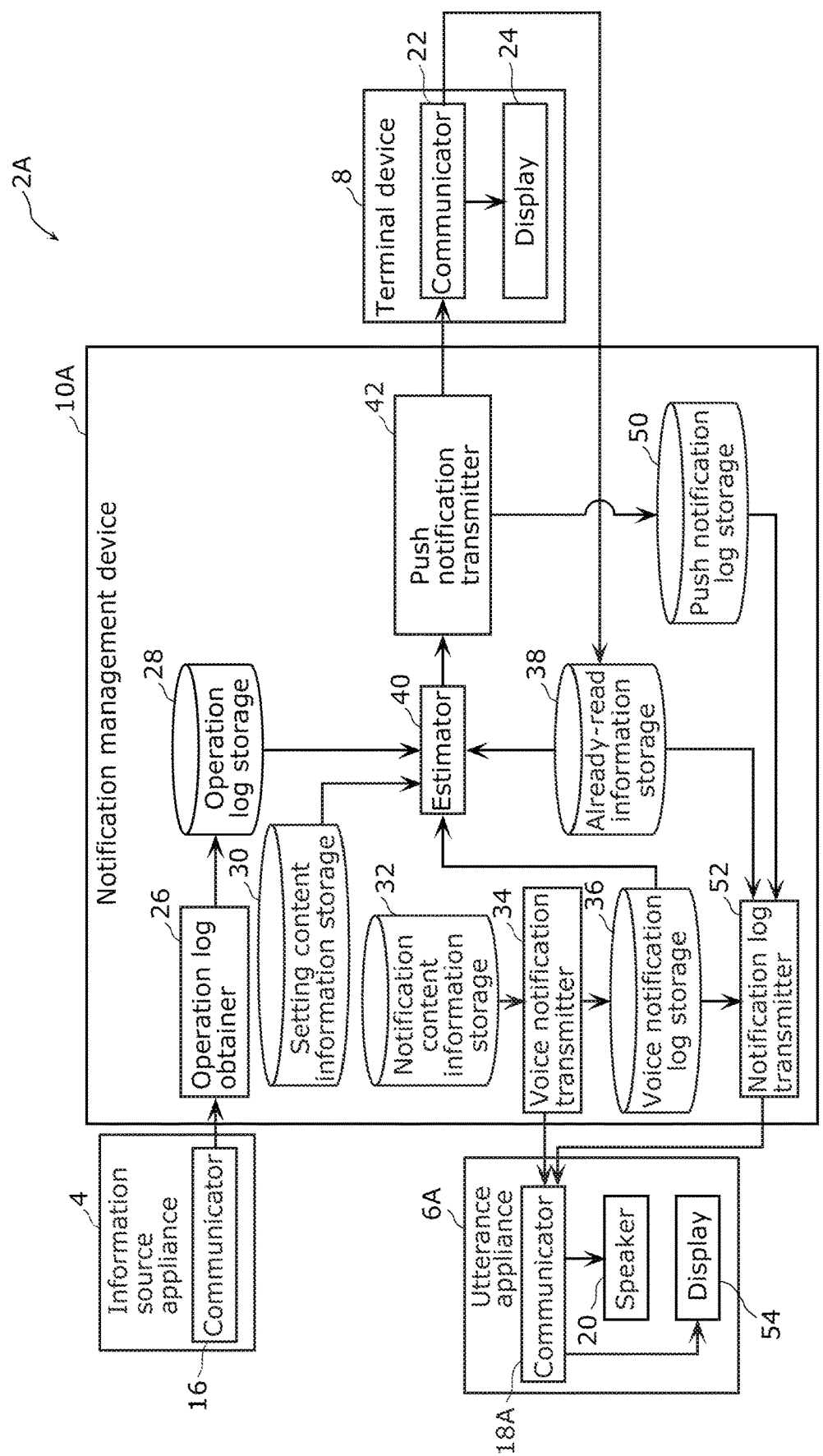
FIG. 6 is a block diagram illustrating the functional structure of a notification system according to Embodiment 2.
Figure 7:
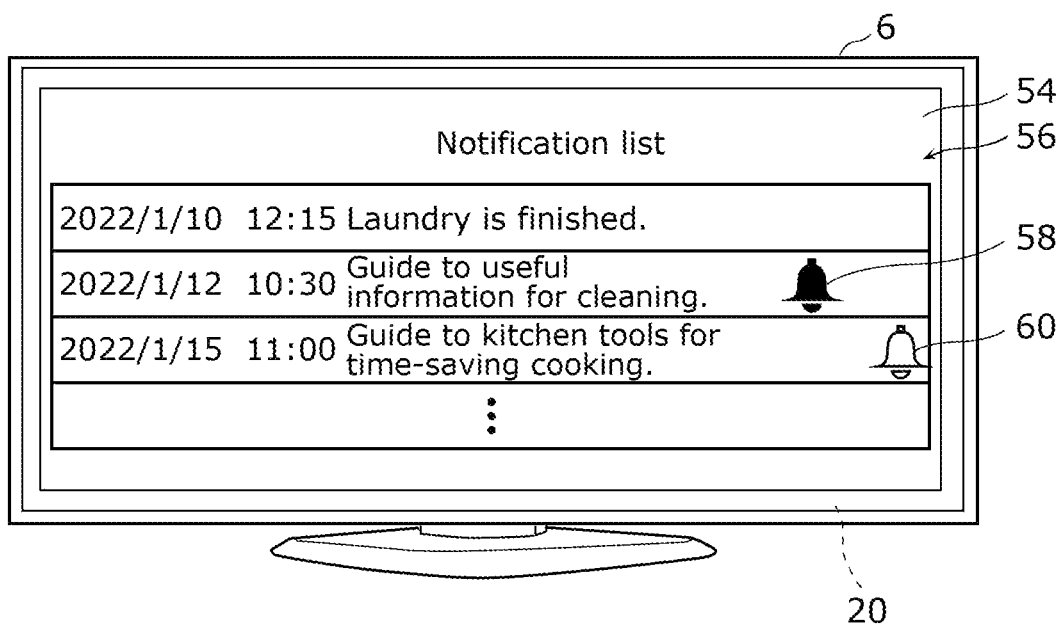
FIG. 7 is a diagram illustrating an example of a notification list screen according to Embodiment 2.

The functional structure of notification system 2A according to Embodiment 2 will be described below with reference to FIGS. 6 and 7. FIG. 6 is a block diagram illustrating the functional structure of notification system 2A according to Embodiment 2. FIG. 7 is a diagram illustrating an example of notification list screen 56 according to Embodiment 2. In each of the following embodiments, the same structural elements as those in Embodiment 1 are given the same reference signs and their description are omitted.

As illustrated in FIG. 6, notification system 2A according to Embodiment 2 differs from that in Embodiment 1 in the structures of notification management device 10A and utterance appliance 6A.

Notification management device 10A includes push notification log storage 50 (an example of a fourth storage) and notification log transmitter 52 (an example of a transmitter), in addition to the structural elements described in Embodiment 1.

Push notification log storage 50 stores a push notification log (an example of push notification history information) indicating the history of push notification transmitted by push notification transmitter 42. The push notification log includes information indicating the notification content of the push notification and the transmission date and time of the push notification.

Notification log transmitter 52 transmits the voice notification log stored in voice notification log storage 36, the already-read information stored in already-read information storage 38, and the push notification log stored in push notification log storage 50 to utterance appliance 6A.

Communicator 18A in utterance appliance 6A receives the voice notification log, the already-read information, and the push notification log, in addition to the voice notification from notification management device 10A.

Utterance appliance 6A includes display 54 in addition to communicator 18A and speaker 20. Display 54 is, for example, a liquid crystal display, and displays notification list screen 56 based on the voice notification log, already-read information, and push notification log received by communicator 18A. Notification list screen 56 is displayed on display 54 by, for example, user 14 (see FIG. 1) operating a remote control or the like.

Notification list screen 56 is a screen illustrated in FIG. 7, for example. As illustrated in FIG. 7, notification list screen 56 displays a list of histories of voice notifications output from utterance appliance 6A in the past and histories of push notifications transmitted to terminal device 8 in the past in chronological order. In the example illustrated in FIG. 7, the first row of notification list screen 56 includes a history of a voice notification of notification content "Laundry is finished.", output from utterance appliance 6A at 12:15 on Jan.

10, 2022. The history of the voice notification is generated based on the voice notification log received by communicator 18A.

The second row of notification list screen 56 includes a history of a push notification of notification content "Guide to useful Information for cleaning." transmitted to terminal device 8 at 10:30 on Jan. 12, 2022, and black already-read bell mark 58 indicating that the notification content of the push notification is marked as read by user 14. The history of the push notification and already-read bell mark 58 are generated based on the push notification log and already-read information received by communicator 18A, respectively.

The third row of notification list screen 56 includes a history of a push notification of notification content "Guide to kitchen tools for time-saving cooking." transmitted to terminal device 8 at 11:00 on Jan. 15, 2022, and white unread bell mark 60 indicating that the notification content of the push notification is not marked as read by user 14. The history of the push notification and unread bell mark 60 are generated based on the push notification log received by communicator 18A and the fact that already-read information has not been received by communicator 18A, respectively.

[2-2. Operation of Notification Management Device]

Figure 8:
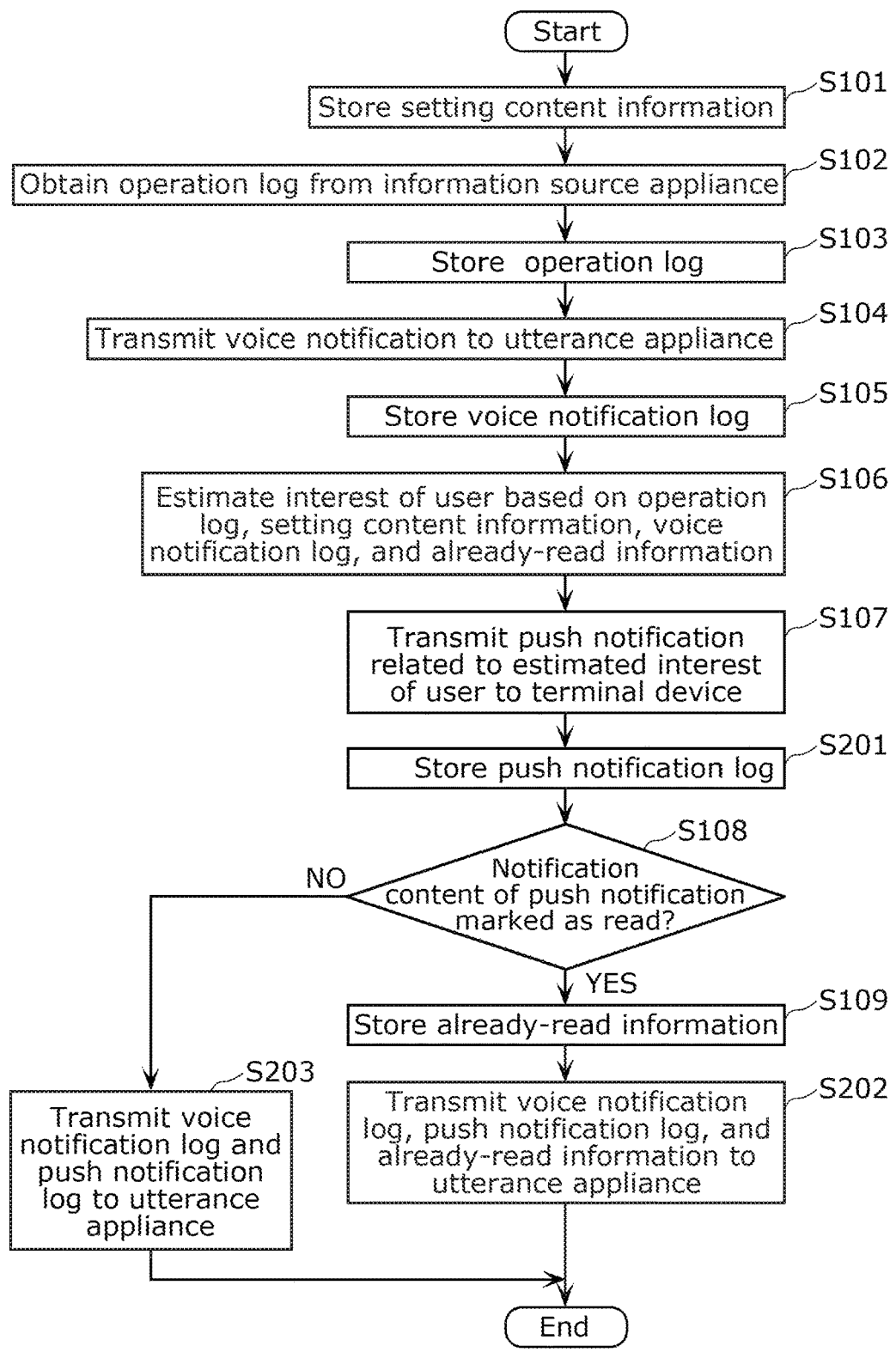
FIG. 8 is a flowchart illustrating the flow of operation of a notification management device according to Embodiment 2.

The operation of notification management device 10A according to Embodiment 2 will be described below with reference to FIG. 8. FIG. 8 is a flowchart illustrating the flow of operation of notification management device 10A according to Embodiment 2. In the flowchart in FIG. 8, the same processes as those in the flowchart in FIG. 4 are given the same step numbers and their description is omitted.

As illustrated in FIG. 8, Steps S101 to S107 are executed as in Embodiment 1. After Step S107, push notification log storage 50 stores a push notification log indicating the history of the push notification transmitted by push notification transmitter 42 (S201).

Subsequently, in the case where the notification content of the push notification is marked as read by user 14 (S108: YES), communicator 22 in terminal device 8 transmits already-read information to notification management device 10A. Already-read information storage 38 then stores the already-read information from terminal device 8 (S109). Notification log transmitter 52 transmits the voice notification log stored in voice notification log storage 36, the already-read information stored in already-read information storage 38, and the push notification log stored in push notification log storage 50 to utterance appliance 6A (S202). The flowchart in FIG. 8 then ends.

In the case where the notification content of the push notification is not marked as read by user 14 in Step S108 (S108: NO), notification log transmitter 52 transmits the voice notification log stored in voice notification log storage 36 and the push notification log stored in push notification log storage 50 to utterance appliance 6A (S203). The flowchart in FIG. 8 then ends.

[2-3. Effects]

In this embodiment, notification management device 10A further includes: push notification log storage 50 that stores a push notification log indicating a history of a push notification transmitted by push notification transmitter 42; already-read information storage 38 that stores already-read information indicating that the notification content of the push notification is marked as read by user 14; and notification log transmitter 52 that transmits the push notification log and the already-read information to utterance appliance 6A.

With this, user 14 can easily check whether the push notification is marked as read, by viewing notification list screen 56 displayed on display 54 in utterance appliance 6A.

Embodiment 3

[3-1. Functional Structure of Notification System]

Figure 9:
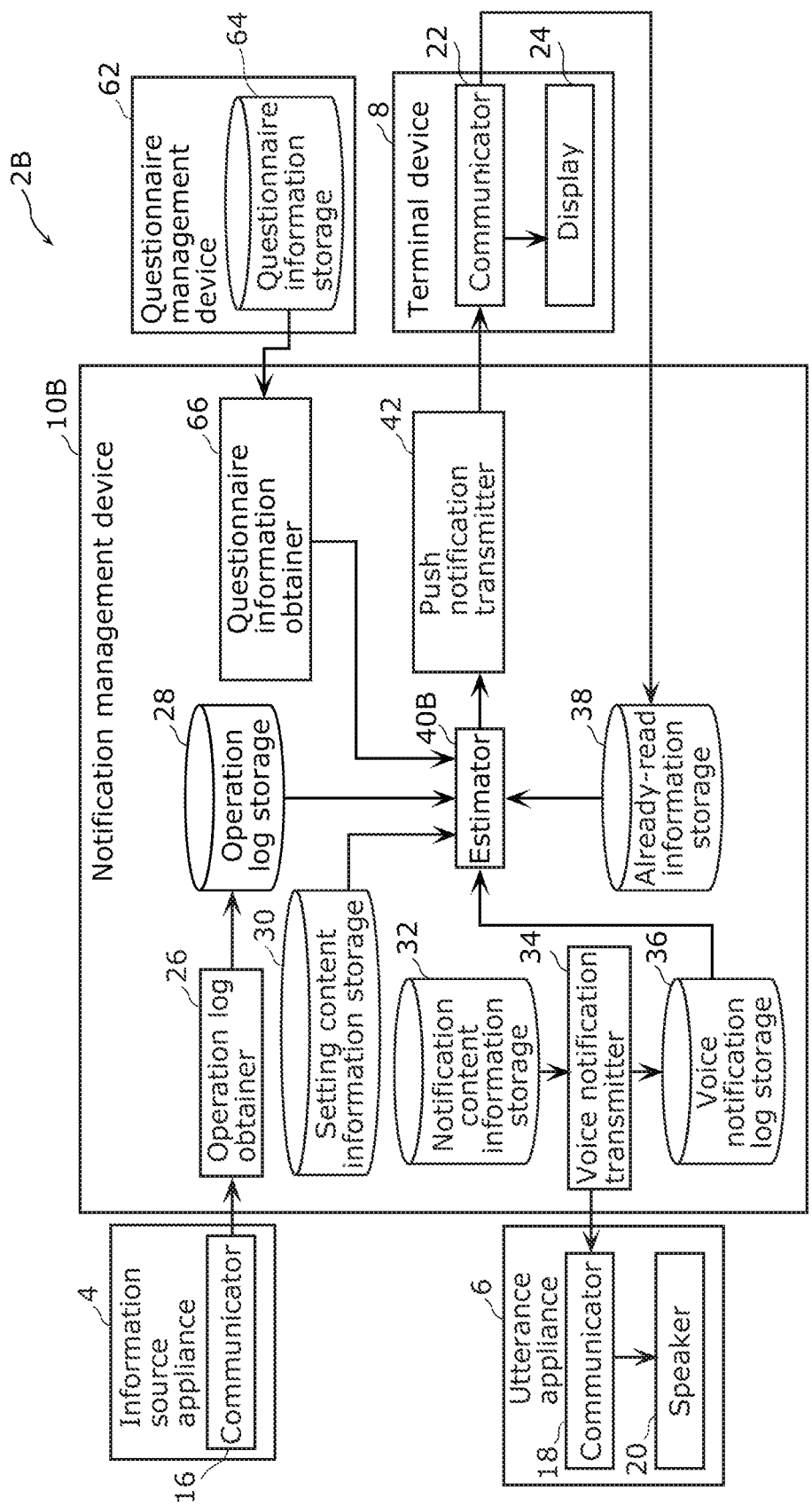
FIG. 9 is a block diagram illustrating the functional structure of a notification system according to Embodiment 3.

The functional structure of notification system 2B according to Embodiment 3 will be described below with reference to FIGS. 9 and 10. FIG. 9 is a block diagram illustrating the functional structure of notification system 2B according to Embodiment 3. FIG. 10 is a diagram illustrating an example of correspondence information 44B according to Embodiment 3.

As illustrated in FIG. 9, notification system 2B according to Embodiment 3 includes questionnaire management device 62 in addition to the structural elements described in Embodiment 1. Questionnaire management device 62 is, for example, a server device, and includes questionnaire information storage 64. Questionnaire information storage 64 stores questionnaire information indicating the results of a questionnaire regarding the Interest of user 14 (see FIG. 1) answered by user 14. The questionnaire information is linked to a user ID for identifying user 14. For example, the questionnaire is conducted on the web periodically or at any timing.

Notification management device 10B includes questionnaire information obtainer 66 (an example of a second obtainer) in addition to the structural elements described in Embodiment 1. Questionnaire information obtainer 66 obtains the questionnaire information from questionnaire information storage 64 in questionnaire management device 62.

Estimator 40B in notification management device 10B estimates the interest of user 14 by referring to correspondence information 44B, based on the operation log, the setting content information, the voice notification log, the already-read information, and the questionnaire information obtained by questionnaire information obtainer 66.

As illustrated in FIG. 10, correspondence information 44B is Information indicating the correspondence relationship between operation logs, setting contents (setting content information) of voice notifications, voice notification logs, notification contents of push notifications marked as read (already-read information), questionnaire answers (questionnaire information), interests of user 14, and notification contents of push notifications related to the Interests of user 14.

In the example illustrated in FIG. 10, the first row of correspondence information 44B includes a) operation log of washing machine (information source appliance 4) "sterilization mode use ≥1 time/week", b) setting content of voice notification "low water tank remaining amount of humidifying air purifier (information source appliance 4)=ON", c) voice notification log "utterance of water tank remaining amount ≥1 time/month (November to March)", d) notification content of push notification marked as read "living room cleaning tips", e) questionnaire answers: "interested in cleaning" and "interested in laundry", f) interest of user 14 "cleanliness of surroundings", and g) notification content of push notification related to interest of user 14 "cleaning", "air (pollen/PM2.5)", and "indoor environment (mold/dust)".

In detail, the first row of correspondence information 44B means the following: In the case where i) user 14 uses the sterilization mode operation of the washing machine (information source appliance 4) at least once a week, ii) user 14 sets output of a voice notification of notification content "low water tank remaining amount of humidifying air purifier (information source appliance 4)" ON, iii) utterance appliance 6 outputs a voice notification of notification content "The water tank remaining amount of the humidifying air purifier (information source appliance 4) is low." at least once a month (November to March), iv) user 14 marked notification content of a push notification "living room cleaning tips" as read in the past, and v) user 14 answered in a questionnaire in the past that user 14 was interested in cleaning and/or laundry, the interest of user 14 is estimated to be "cleanliness of surroundings", and notification contents of push notifications related to the interest of user 14 are "cleaning", "air (pollen/PM2.5)", and "indoor environment (mold/dust)".

[3-2. Operation of Notification Management Device]

Figure 11:
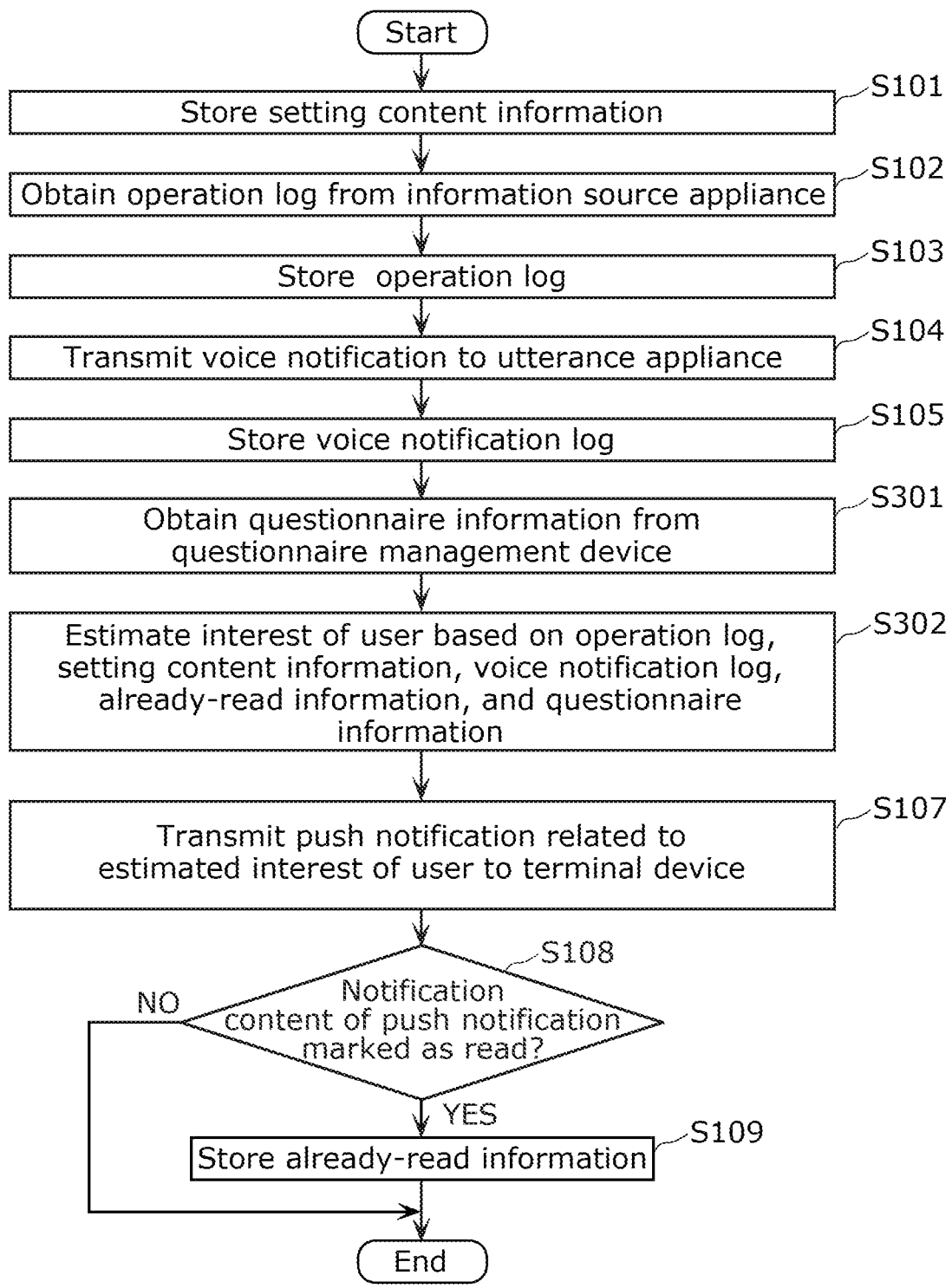
FIG. 11 is a flowchart illustrating the flow of operation of a notification management device according to Embodiment 3.

The operation of notification management device 10B according to Embodiment 3 will be described below with reference to FIG. 11. FIG. 11 is a flowchart illustrating the flow of operation of notification management device 10B according to Embodiment 3. In the flowchart in FIG. 11, the same processes as those in the flowchart in FIG. 4 are given the same step numbers and their description is omitted.

As illustrated in FIG. 11, Steps S101 to S105 are executed as in Embodiment 1. After Step S105, questionnaire information obtainer 66 obtains questionnaire information from questionnaire information storage 64 in questionnaire management device 62 (S301). Estimator 40B estimates the interest of user 14 by referring to correspondence information 44B, based on the operation log, the setting content information, the voice notification log, the already-read information, and the questionnaire information obtained by questionnaire information obtainer 66 (S302). After this, Steps S107 to S109 are executed as in Embodiment 1.

[3-3. Effects]

In this embodiment, notification management device 10B further includes questionnaire information obtainer 66 that obtains questionnaire information indicating a result of a questionnaire regarding the interest of user 14 answered by user 14. Estimator 40B estimates the interest of user 14 based on the operation log, the setting content information, the voice notification log, the already-read information, and the questionnaire information.

With this, the interest of user 14 can be estimated more accurately. Estimator 40B may estimate the interest of user 14 based on the operation log, the setting content information, the voice notification log, and the questionnaire information while the already-read information is omitted.

Embodiment 4

[4-1. Functional Structure of Notification System]

Figure 12:
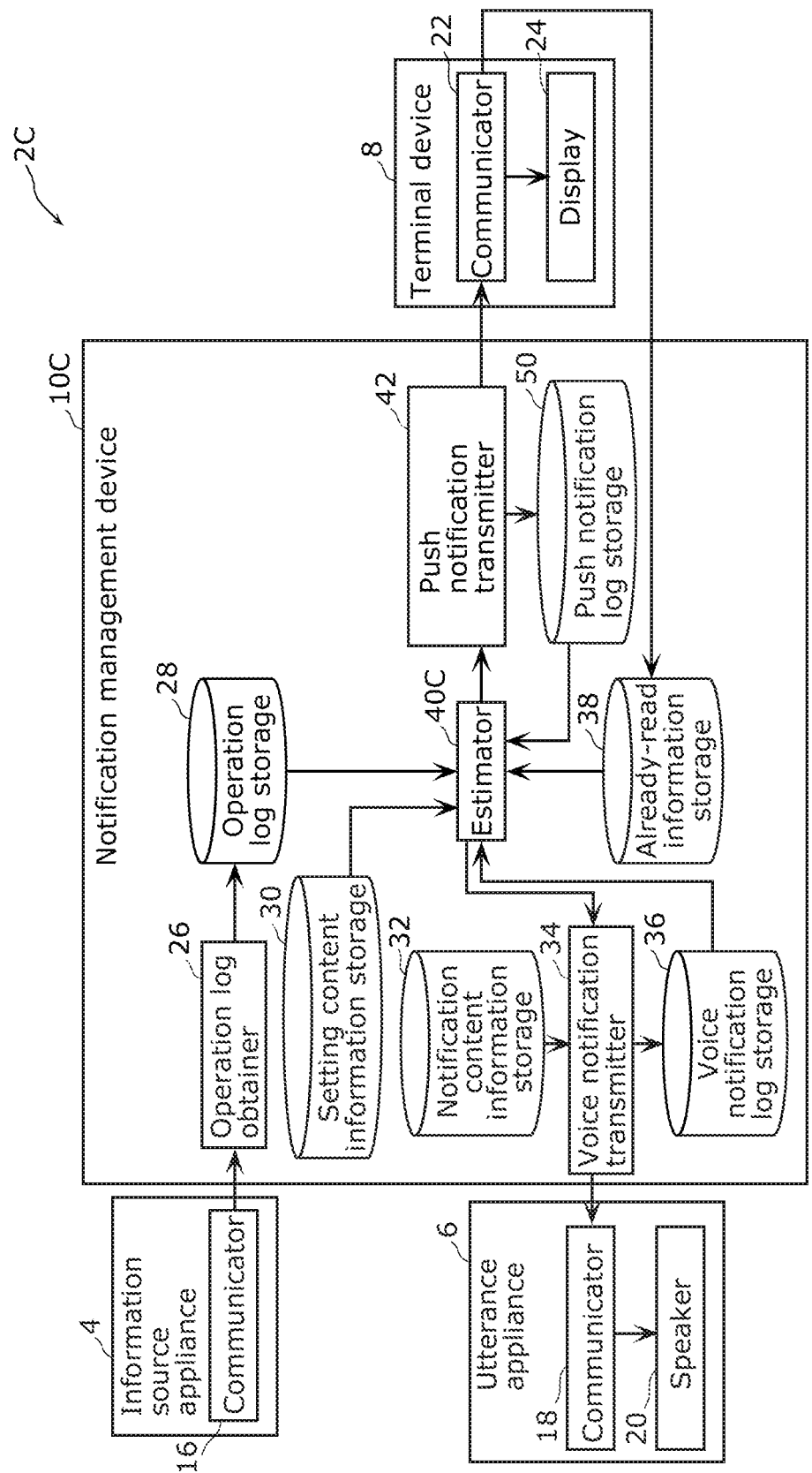
FIG. 12 is a block diagram illustrating the functional structure of a notification system according to Embodiment 4.

The functional structure of notification system 2C according to Embodiment 4 will be described below with reference to FIGS. 12 and 13. FIG. 12 is a block diagram illustrating the functional structure of notification system 2C according to Embodiment 4. FIG. 13 is a diagram illustrating an example of selection table 68 according to Embodiment 4.

As illustrated in FIG. 12, in notification system 2C according to Embodiment 4, notification management device 10C includes push notification log storage 50 described in Embodiment 2 in addition to the structural elements described in Embodiment 1. In notification system 2C, the operation of estimator 40C (an example of an estimator and a selector) in notification management device 10C differs from that in Embodiment 1.

Estimator 40C determines whether to notify user 14 (see FIG. 1) of notification content related to the estimated interest of user 14 and selects a notification method, by referring to selection table 68 based on the setting content information and the transmission history of push notification related to the estimated interest of user 14. In this embodiment, "setting content information" includes not only (i) information indicating setting content of ON/OFF of voice notification output set by user 14 but also (ii) information indicating setting content of whether setting content information is used to estimate the interest of user 14, for example set by the administrator of notification system 2C. "Transmission history of push notification" includes (i) whether there is a transmission history of a push notification and (ii) whether the push notification is marked as read.

Estimator 40C determines whether the setting content information is used to estimate the interest of user 14 and determines whether the output of the voice notification is set ON or OFF by user 14, by referring to setting content information storage 30. Estimator 40C also determines whether there is transmission history of push notification, by referring to push notification log storage 50. Estimator 40C further determines whether the push notification is marked as read, by referring to already-read information storage 38.

Although the "estimator" and the "selector" are formed as one structure (estimator 40C) in this embodiment, the present disclosure is not limited to such, and the "estimator" and the "selector" may be separate structures.

Selection table 68 is, for example, a data table illustrated in FIG. 13. As illustrated in FIG. 13, selection table 68 is information indicating the correspondence relationship between setting content information, transmission history of push notification, and notification method.

In the example illustrated in FIG. 13, in the case where (i) the setting content information is used to estimate the interest of user 14, (ii) user 14 sets voice notification output ON, (iii) there is transmission history of push notification, and (iv) the push notification is marked as read (hereafter referred to as "case 1"), estimator 40C determines to notify user 14 of the notification content and selects both voice notification and push notification as the notification method.

In the case where (i) the setting content information is used to estimate the interest of user 14, (ii) user 14 sets voice notification output ON, (iii) there is transmission history of push notification, and (iv) the push notification is not marked as read (hereafter referred to as "case 2"), estimator 40C determines to notify user 14 of the notification content and selects only voice notification as the notification method.

In the case where (i) the setting content information is used to estimate the interest of user 14, (ii) user 14 sets voice notification output ON, and (iii) there is no transmission history of push notification (hereafter referred to as "case 3"), estimator 40C determines to notify user 14 of the notification content and selects both voice notification and push notification as the notification method. Although both voice notification and push notification are selected as the notification method in case 3, the present disclosure is not limited to such, and any notification method may be set depending on the notification content.

In the case where (i) the setting content information is used to estimate the interest of user 14, (ii) user 14 sets voice notification output OFF, (iii) there is transmission history of push notification, and (iv) the push notification is marked as read (hereafter referred to as "case 4"), estimator 40C determines to notify user 14 of the notification content and selects only push notification as the notification method.

In the case where (i) the setting content information is used to estimate the interest of user 14, (ii) user 14 sets voice notification output OFF, (iii) there is transmission history of push notification, and (iv) the push notification is not marked as read (hereafter referred to as "case 5"), estimator 40C determines not to notify user 14 of the notification content.

In the case where (i) the setting content information is used to estimate the interest of user 14, (ii) user 14 sets voice notification output OFF, and (iii) there is no transmission history of push notification (hereafter referred to as "case 6"), estimator 40C determines to notify user 14 of the notification content and selects only push notification as the notification method.

In the case where (i) the setting content information is not used to estimate the interest of user 14, (ii) there is transmission history of push notification, and (ill) the push notification is marked as read (hereafter referred to as "case 7"), estimator 40C determines to notify user 14 of the notification content and selects both voice notification and push notification as the notification method.

In the case where (i) the setting content information is not used to estimate the interest of user 14, (ii) there is transmission history of push notification, and (ill) the push notification is not marked as read (hereafter referred to as "case 8"), estimator 40C determines to notify user 14 of the notification content and selects only voice notification as the notification method.

In the case where (i) the setting content information is not used to estimate the interest of user 14 and (ii) there is no transmission history of push notification (hereafter referred to as "case 9"), estimator 40C determines to notify user 14 of the notification content and selects only push notification as the notification method. Although only push notification is selected as the notification method in case 9, the present disclosure is not limited to such, and any notification method may be set depending on the notification content.

Returning to FIG. 12, voice notification transmitter 34 (an example of a notifier) reads notification content related to the interest of user 14 estimated by estimator 40C from correspondence information 44 (see FIG. 3) and transmits a voice notification of the read notification content to utterance appliance 6, in the case where estimator 40C determines to notify user 14 of the notification content and selects only voice notification (or both voice notification and push notification) as the notification method. In this embodiment, "notification content of push notification" in correspondence information 44 illustrated in FIG. 3 is replaced with "notification content of push notification or voice notification".

Push notification transmitter 42 (an example of a notifier) reads the notification content related to the interest of user 14 estimated by estimator 40C from correspondence information 44 and transmits a push notification of the read notification content to terminal device 8, in the case where estimator 40C determines to notify user 14 of the notification content and selects only push notification (or both voice notification and push notification) as the notification method.

[4-2. Operation of Notification Management Device]

Figure 14:
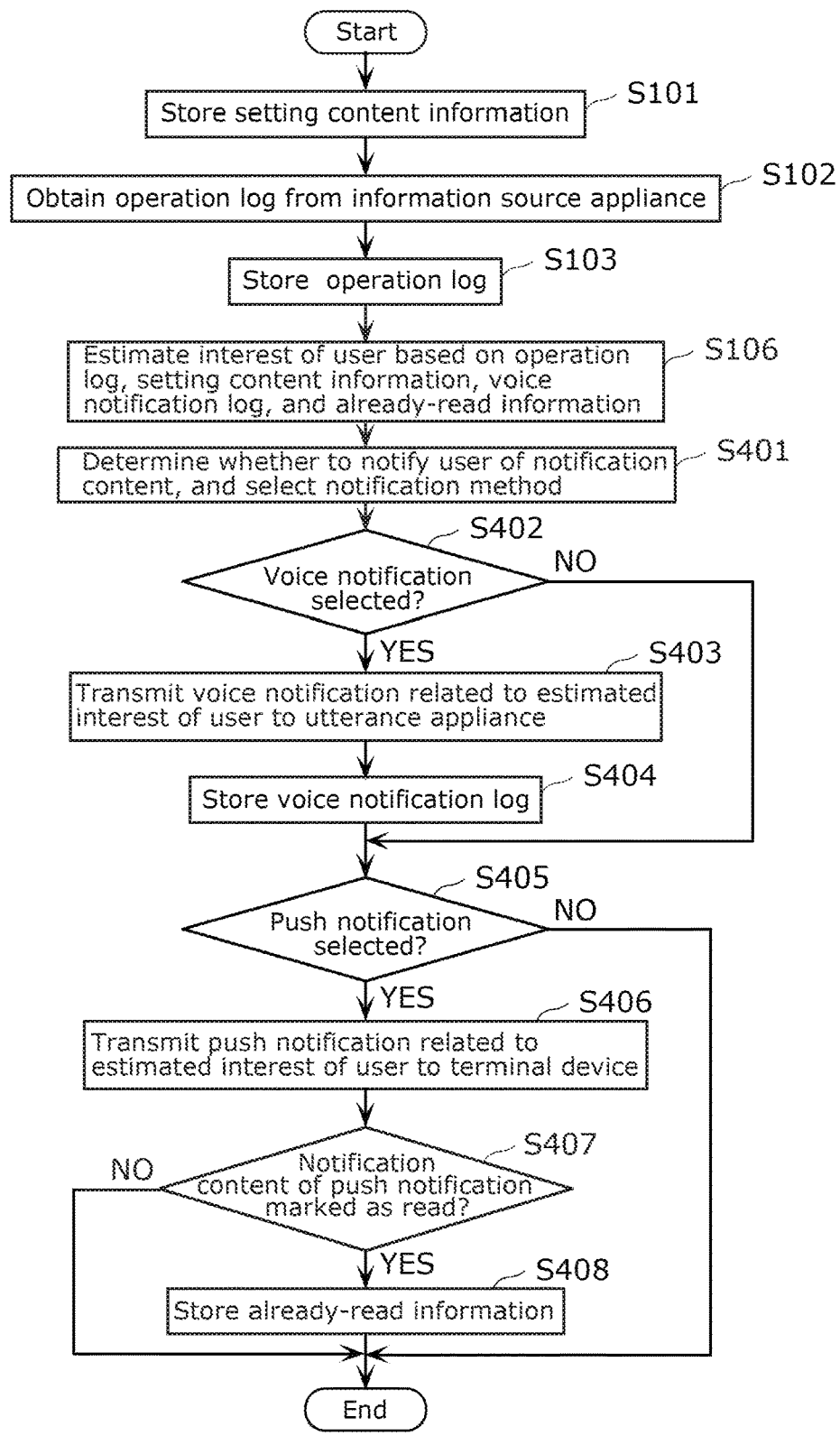
FIG. 14 is a flowchart illustrating the flow of operation of a notification management device according to Embodiment 4.

The operation of notification management device 10C according to Embodiment 4 will be described below with reference to FIG. 14. FIG. 14 is a flowchart illustrating the flow of operation of notification management device 10C according to Embodiment 4. In the flowchart in FIG. 14, the same processes as those in the flowchart in FIG. 4 are given the same step numbers and their description is omitted.

As illustrated in FIG. 14, first, Steps S101 to S103 are executed as in Embodiment 1. After Step S103, estimator 40C estimates the interest of user 14 as in Embodiment 1 (S106).

After Step S106, estimator 40C determines whether to notify user 14 of notification content related to the estimated interest of user 14 and selects a notification method, by referring to selection table 68 based on the setting content information and the transmission history of push notification related to the estimated interest of user 14 (S401).

In the case where only voice notification (or both voice notification and push notification) is selected as the notification method (S402; YES), voice notification transmitter 34 reads the notification content related to the interest of user 14 estimated by estimator 40C from correspondence information 44, and transmits a voice notification of the read notification content to utterance appliance 6 (S403). Consequently, speaker 20 in utterance appliance 6 outputs the voice notification from notification management device 10C. Voice notification log storage 36 stores a voice notification log indicating the history of the voice notification transmitted by voice notification transmitter 34 (S404).

In the case where only push notification is selected as the notification method in Step S402 (S402: NO, S405: YES), push notification transmitter 42 reads the notification content related to the interest of user 14 estimated by estimator 40C from correspondence information 44 and transmits a push notification of the read notification content to terminal device 8 (S406). Consequently, display 24 in terminal device 8 displays the push notification from notification management device 10C.

In the case where the notification content of the push notification is marked as read by user 14 (S407: YES), communicator 22 in terminal device 8 transmits already-read information to notification management device 10C. Already-read information storage 38 stores the already-read information from terminal device 8 (S408). The flowchart in FIG. 14 then ends. In the case where the notification content of the push notification is not marked as read by user 14 (S407: NO), the flowchart in FIG. 14 ends.

In the case where both voice notification and push notification are selected as the notification method in Step S402 (S402: YES, S405: YES), Steps S402 to S406 are executed in this order.

In the case where neither voice notification nor push notification is selected as the notification method in Step S402, that is, in the case where it is determined not to notify user 14 of the notification content (S402: NO, S405: NO), the flowchart in FIG. 14 ends.

[4-3. Specific Examples of Cases 1 to 9]

Figure 15:
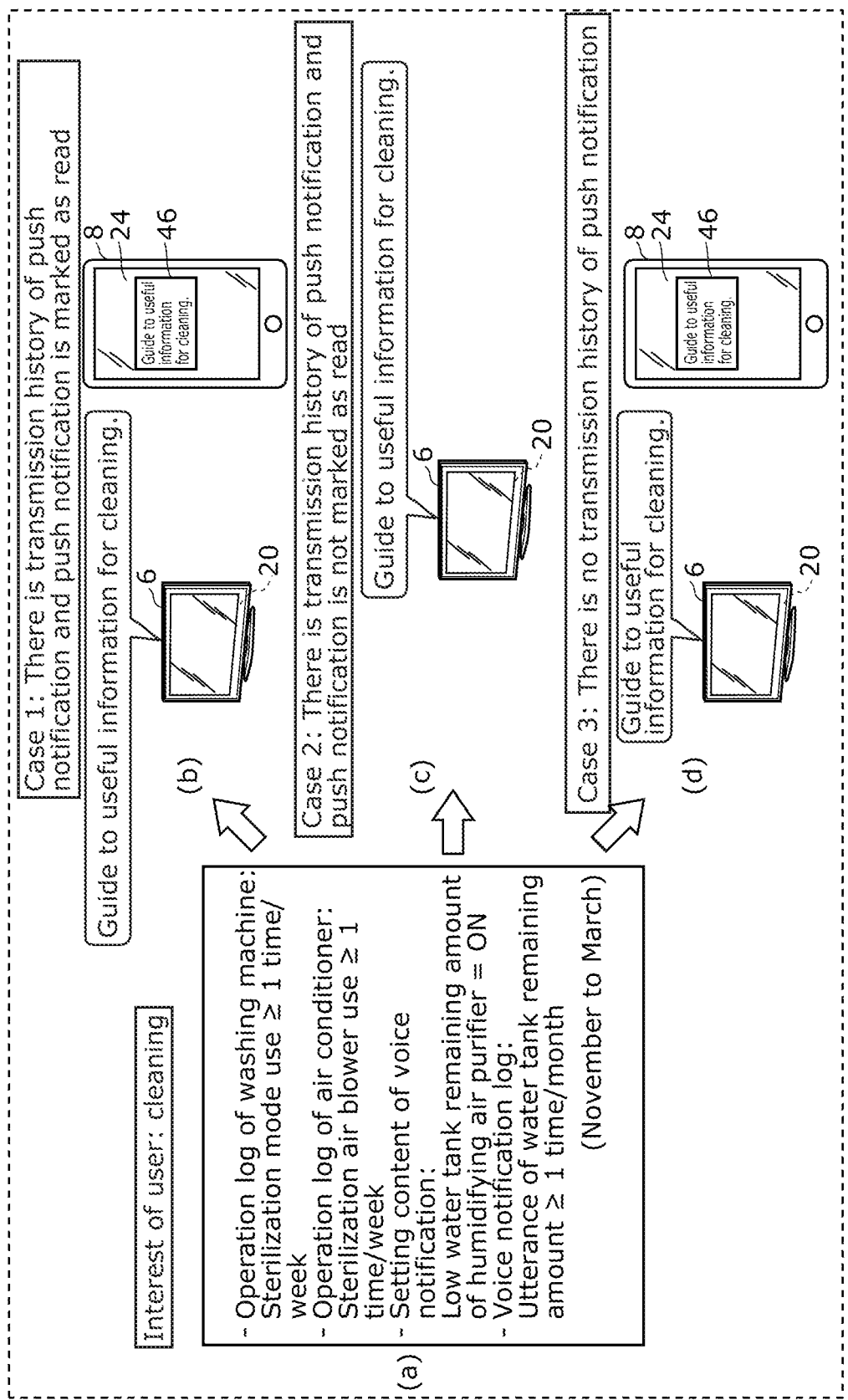
FIG. 15 is a diagram illustrating specific examples of cases 1 to 3 in the notification system according to Embodiment 4.

Specific examples of cases 1 to 3 will be described below with reference to FIG. 15. FIG. 15 is a diagram illustrating specific examples of cases 1 to 3 in notification system 2C according to Embodiment 4.

An example in which estimator 40C estimates the interest of user 14 to be "cleaning" will be described below, as illustrated in (a) in FIG. 15. In cases 1 to 3, setting content information related to "cleaning" is used to estimate the interest of user 14 and user 14 sets output of voice notification related to "cleaning" ON, as mentioned above.

As Illustrated in (b) in FIG. 15, in case 1, estimator 40C determines to notify user 14 of the notification content and selects both voice notification and push notification as the notification method. In this case, speaker 20 in utterance appliance 6 outputs, for example, a voice notification of notification content "Guide to useful information for cleaning." from notification management device 10C. Moreover, display 24 in terminal device 8 displays, for example, push notification 46 of notification content "Guide to useful information for cleaning." from notification management device 10C.

As Illustrated in (c) in FIG. 15, in case 2, estimator 40C determines to notify user 14 of the notification content and selects only voice notification as the notification method. In this case, speaker 20 in utterance appliance 6 outputs, for example, a voice notification of notification content "Guide to useful information for cleaning." from notification management device 10C.

As illustrated in (d) in FIG. 15, in case 3, estimator 40C determines to notify user 14 of the notification content and selects both voice notification and push notification as the notification method. In this case, speaker 20 in utterance appliance 6 outputs, for example, a voice notification of notification content "Guide to useful information for cleaning," from notification management device 10C. Moreover, display 24 in terminal device 8 displays, for example, push notification 46 of notification content "Guide to useful information for cleaning." from notification management device 10C.

Figure 16:
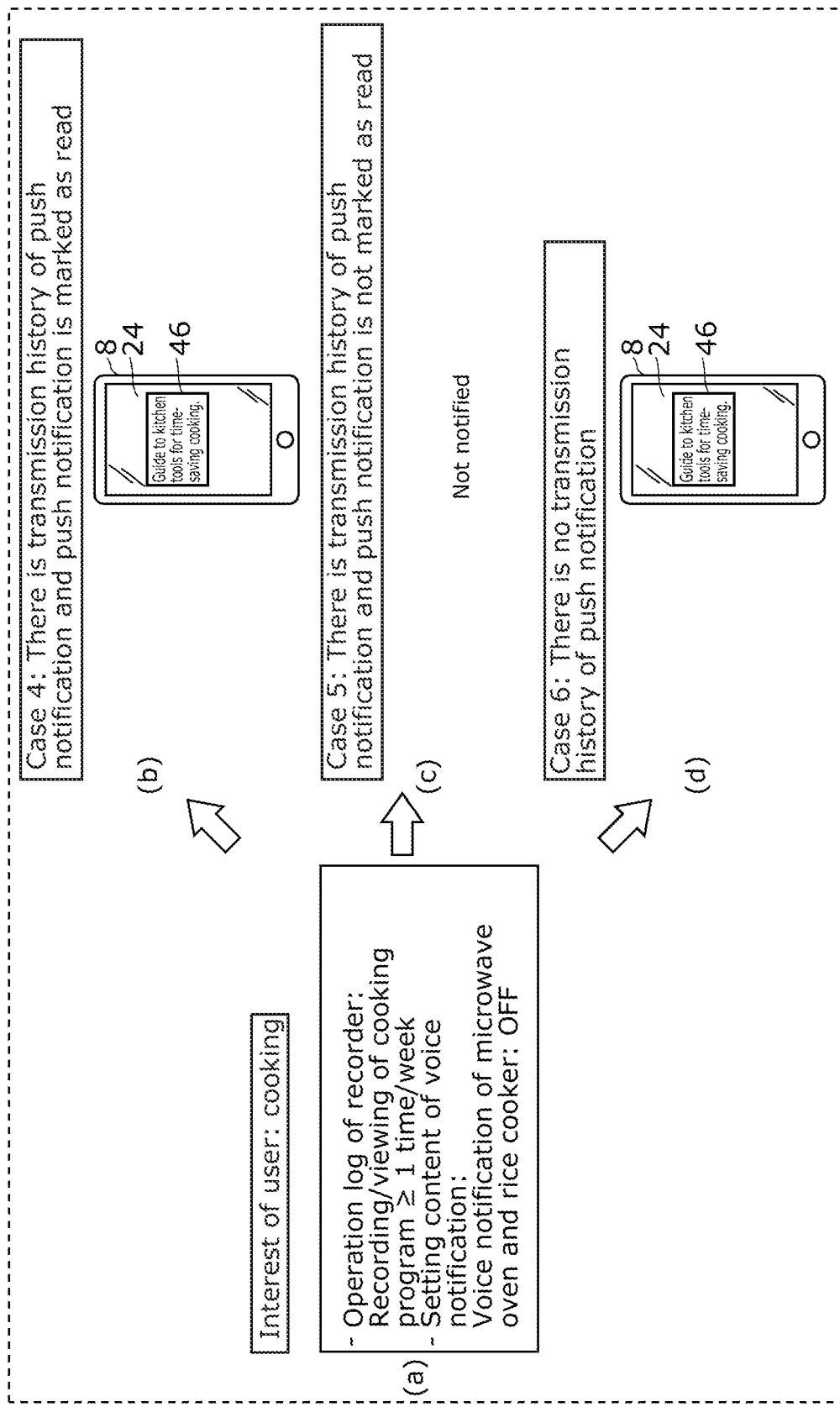
FIG. 16 is a diagram illustrating specific examples of cases 4 to 6 in the notification system according to Embodiment 4.

Specific examples of cases 4 to 6 will be described below with reference to FIG. 16. FIG. 16 is a diagram illustrating specific examples of cases 4 to 6 in notification system 2C according to Embodiment 4.

An example in which estimator 40C estimates the interest of user 14 to be "cooking" will be described below, as illustrated in (a) in FIG. 16. In cases 4 to 6, setting content information related to "cooking" is used to estimate the interest of user 14 and user 14 sets output of voice notification related to "cooking" OFF, as mentioned above.

As Illustrated in (b) in FIG. 16, in case 4, estimator 40C determines to notify user 14 of the notification content and selects only push notification as the notification method. In this case, display 24 in terminal device 8 displays, for example, push notification 46 of notification content "Guide to kitchen tools for time-saving cooking." from notification management device 10C. Here, display 24 in terminal device 8 may display a message prompting user 14 to set output of voice notification related to "cooking" ON.

As illustrated in (c) in FIG. 16, in case 5, estimator 40C determines not to notify user 14 of the notification content. In this case, speaker 20 in utterance appliance 6 does not output a voice notification, and display 24 in terminal device 8 does not display push notification 46.

As illustrated in (d) in FIG. 16, in case 6, estimator 40C determines to notify user 14 of the notification content and selects only push notification as the notification method. In this case, display 24 in terminal device 8 displays, for example, push notification 46 of notification content "Guide to kitchen tools for time-saving cooking." from notification management device 10C.

Figure 17:
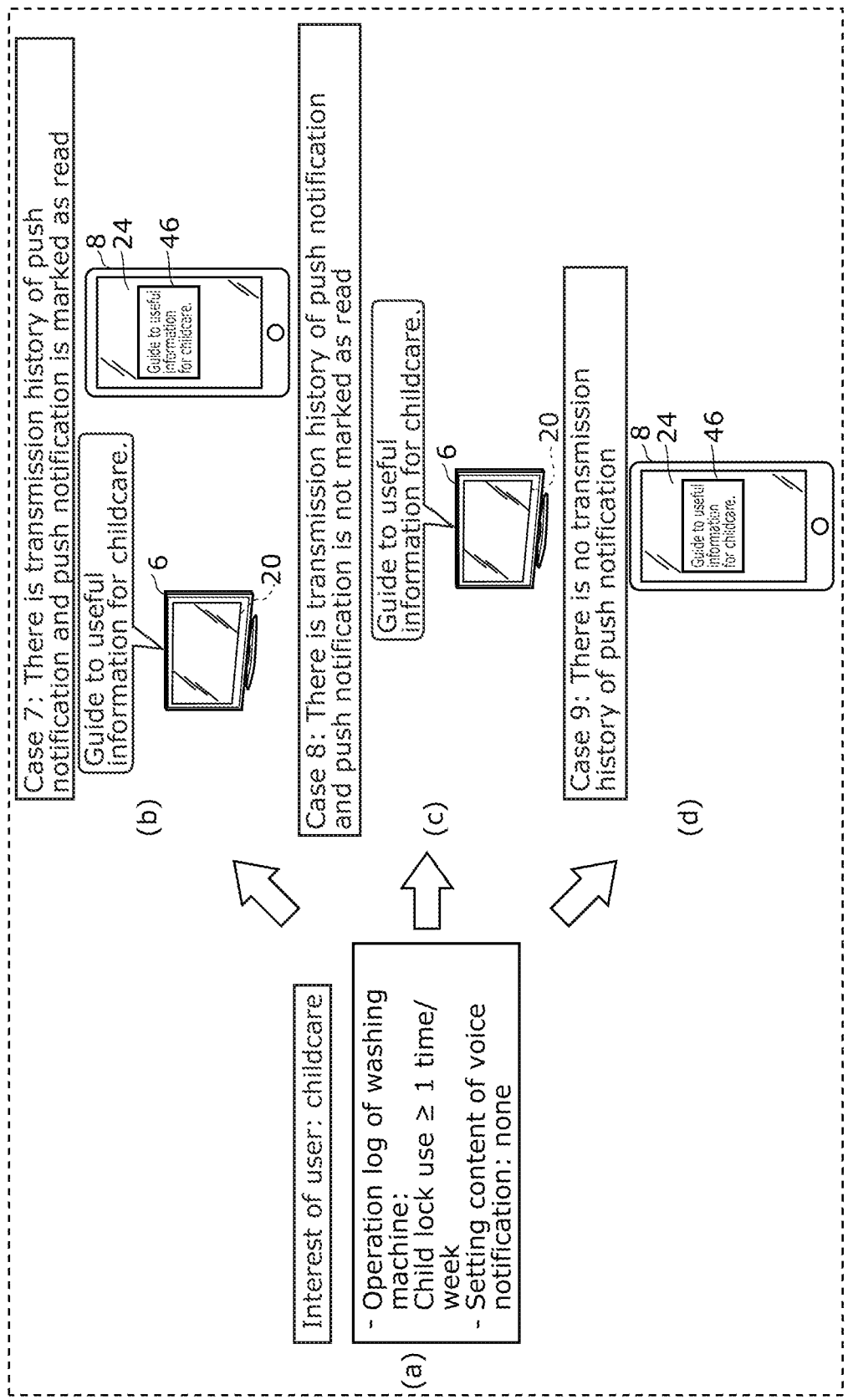
FIG. 17 is a diagram illustrating specific examples of cases 7 to 9 in the notification system according to Embodiment 4.

Specific examples of cases 7 to 9 will be described below with reference to FIG. 17. FIG. 17 is a diagram illustrating specific examples of cases 7 to 9 in notification system 2C according to Embodiment 4.

An example in which estimator 40C estimates the interest of user 14 to be "childcare" will be described below, as illustrated in (a) in FIG. 17. In cases 7 to 9, setting content information related to "childcare" is not used to estimate the interest of user 14, as mentioned above.

As Illustrated in (b) in FIG. 17, in case 7, estimator 40C determines to notify user 14 of the notification content and selects both voice notification and push notification as the notification method. In this case, speaker 20 in utterance appliance 6 outputs, for example, a voice notification of notification content "Guide to useful information for childcare." from notification management device 10C. Moreover, display 24 in terminal device 8 displays, for example, push notification 46 of notification content "Guide to useful information for childcare." from notification management device 10C.

As illustrated in (c) in FIG. 17, in case 8, estimator 40C determines to notify user 14 of the notification content and selects only voice notification as the notification method. In this case, speaker 20 in utterance appliance 6 outputs, for example, a voice notification of notification content "Guide to useful information for childcare." from notification management device 10C.

As illustrated in (d) in FIG. 17, in case 9, estimator 40C determines to notify user 14 of the notification content and selects only push notification as the notification method. In this case, display 24 in terminal device 8 displays, for example, push notification 46 of notification content "Guide to useful information for childcare." from notification management device 10C.

[4-4, Effects]

In this embodiment, notification management device 10C is a device that communicates, via network 12, with each of terminal device 8, information source appliance 4, and utterance appliance 6 that outputs a voice notification to user 14. Notification management device 10C includes: operation log obtainer 26 that obtains an operation log indicating a state of information source appliance 4 operated by user 14, from information source appliance 4; operation log storage 28 that stores the operation log obtained by operation log obtainer 26; setting content information storage 30 that stores setting content information indicating setting content of the voice notification of utterance appliance 6; voice notification log storage 36 that stores a voice notification log indicating a history of the voice notification output by utterance appliance 6 based on the setting content; estimator 40C that estimates an interest of user 14 based on at least one of the operation log, the setting content information, or the voice notification log, determines whether to notify user 14 of notification content related to the estimated interest of user 14, and selects a notification method; and voice notification transmitter 34 (push notification transmitter 42) that transmits a notification indicating the notification content to utterance appliance 6 (terminal device 8) by the notification method selected by estimator 40C, in the case where estimator 40C determines to notify user 14 of the notification content.

With this, estimator 40C estimates the interest of user 14 based on at least one of the operation log, the setting content information, or the voice notification log, and selects the notification method. Voice notification transmitter 34 (push notification transmitter 42) then transmits the notification to utterance appliance 6 (terminal device 8) by the notification method selected by estimator 40C. Thus, user 14 can be notified of useful notification content.

In this embodiment, estimator 40C selects, as the notification method, at least one of a push notification transmitted to terminal device 8 or the voice notification transmitted to utterance appliance 6.

With this, user 14 can be notified of useful notification content by a more effective notification method.

In this embodiment, estimator 40C selects the notification method based on the setting content information and the transmission history of the push notification related to the interest of user 14 estimated by estimator 40C.

With this, a more effective notification method can be selected.

In this embodiment, notification system 2C includes: terminal device 8; information source appliance 4; utterance appliance 6; and notification management device 10C that communicates with terminal device 8, information source appliance 4, and utterance appliance 6 via network 12. Information source appliance 4 includes communicator 16 that transmits an operation log indicating a state of information source appliance 4 operated by user 14, to notification management device 10C. Utterance appliance 6 includes speaker 20 that outputs a voice notification to user 14. Notification management device 10C includes: operation log obtainer 26 that obtains the operation log from information source appliance 4; operation log storage 28 that stores the operation log obtained by operation log obtainer 26; setting content information storage 30 that stores setting content information indicating setting content of the voice notification of utterance appliance 6; voice notification log storage 36 that stores a voice notification log indicating a history of the voice notification output by utterance appliance 6 based on the setting content; estimator 40C that estimates an interest of user 14 based on at least one of the operation log, the setting content information, or the voice notification log, determines whether to notify user 14 of notification content related to the estimated interest of user 14, and selects a notification method; and voice notification transmitter 34 (push notification transmitter 42) that transmits a notification indicating the notification content to utterance appliance 6 (terminal device 8) by the notification method selected by estimator 40C, in the case where estimator 40C determines to notify user 14 of the notification content.

With this, user 14 can be notified of useful notification content as mentioned above.

In this embodiment, a control method is a control method of notification management device 10C that communicates, via network 12, with each of terminal device 8, information source appliance 4, and utterance appliance 6 that outputs a voice notification to user 14. The control method of notification management device 10C includes: (a) obtaining an operation log indicating a state of information source appliance 4 operated by user 14, from information source appliance 4; (b) storing the operation log obtained in (a), in operation log storage 28; (c) storing setting content information indicating setting content of the voice notification of utterance appliance 6 set by user 14, in setting content information storage 30; (d) storing a voice notification log indicating a history of the voice notification output by utterance appliance 6 based on the setting content, in voice notification log storage 36; (e) estimating an interest of user 14 based on at least one of the operation log, the setting content information, or the voice notification log; (f) determining whether to notify user 14 of notification content related to the interest of user 14 estimated in (e), and selecting a notification method; and (g) transmitting a notification indicating the notification content to at least one of terminal device 8 or utterance appliance 6 by the notification method selected in (f), when it is determined to notify user 14 of the notification content in (f).

With this, user 14 can be notified of useful notification content as mentioned above.

In this embodiment, a program causes a computer to execute the foregoing control method of notification management device 10C.

(Variations, etc.)

Although each embodiment has been described above to illustrate the presently disclosed technology, the present disclosure is not limited to such. Changes, replacements, additions, omissions, etc. may be made to each embodiment as appropriate, and structural elements described in each embodiment may be combined as a new embodiment.

Other exemplary embodiments will be described below.

In Embodiment 1, estimator 40 estimates the interest of user 14 based on the operation log, the setting content information, the voice notification log, and the already-read information. However, the present disclosure is not limited to such, and estimator 40 may estimate the interest of user 14 based on at least one of the operation log, the setting content information, or the voice notification log. For example, estimator 40 may estimate the interest of user 14 based on only the operation log. In this case, for example, if the operation log of the washing machine (information source appliance 4) is "child lock use ≥1 time/week", estimator 40 estimates the Interest of user 14 to be "childcare", and push notification transmitter 42 transmits a push notification of notification content "childcare" or "intellectual training" to terminal device 8.

In Embodiment 2, notification log transmitter 52 transmits the voice notification log, the already-read information, and the push notification log to utterance appliance 6A. However, the present disclosure is not limited to such, and notification log transmitter 52 may transmit these information to terminal device 8 or to both utterance appliance 6A and terminal device 8. In this case, notification list screen 56 may be displayed on display 24 in terminal device 8, or on both display 54 in utterance appliance 6A and display 24 in terminal device 8.

Although information source appliance 4 and utterance appliance 6 (6A) are separate appliances in each of the foregoing embodiments, the present disclosure is not limited to such, and information source appliance 4 and utterance appliance 6 (6A) may be the same appliance.

Although notification management device 10 (10A, 108, 10C) notifies user 14 of the notification content related to the interest of user 14 by push notification in each of the foregoing embodiments, the present disclosure is not limited to such, and user 14 may be notified of the notification content not by push notification but by e-mail, to-do list, memo, or the like. To-do list and memo are functions of applications installed on terminal device 8.

Each of the structural elements in each of the foregoing embodiments may be configured in the form of an exclusive hardware product, or may be realized by executing a software program suitable for the structural element. Each of the structural elements may be realized by means of a program executing unit, such as a CPU and a processor, reading and executing the software program recorded on a non-transitory computer-readable recording medium such as a hard disk or semiconductor memory.

Part or all of the functions of notification management device 10 (10A, 10B, 10C) according to each of the foregoing embodiments may be implemented by a processor such as a CPU executing a program.

The foregoing embodiments have been described to illustrate the presently disclosed technology, through the detailed description and the accompanying drawings.

The structural elements in the detailed description and the accompanying drawings may include not only the structural elements essential for the solution of the problem but also the structural elements not essential for the solution of the problem, to illustrate the presently disclosed technology. The inclusion of such optional structural elements in the detailed description and the accompanying drawings therefore does not mean that these optional structural elements are essential structural elements.

The foregoing embodiments are intended to be illustrative of the presently disclosed technology, and various changes, replacements, additions, omissions, etc. can be made within the scope of the appended claims and their equivalents.

INDUSTRIAL APPLICABILITY

The presently disclosed technology can be used as a notification management device, etc.

The invention claimed is:

1. A notification management device that communicates, via a network, with each of a terminal device, a first appliance, and a second appliance that outputs a voice notification to a user, the notification management device comprising:
   a first obtainer that obtains appliance state information indicating a state of the first appliance operated by the user, from the first appliance;
   a first storage that stores the appliance state information obtained by the first obtainer;
   a second storage that stores setting content information indicating setting content of the voice notification of the second appliance set by the user;
   a third storage that stores voice notification history information indicating a history of the voice notification output by the second appliance based on the setting content;
   an estimator that estimates an interest of the user based on at least one of the appliance state information, the setting content information, or the voice notification history information; and
   a notifier that transmits, to the terminal device, a push notification for notifying the user of notification content related to the interest of the user estimated by the estimator.

2. The notification management device according to claim 1, further comprising:
   a fourth storage that stores push notification history information indicating a history of the push notification transmitted by the notifier;
   a fifth storage that stores already-read information indicating that the notification content of the push notification is marked as read by the user; and
   a transmitter that transmits the push notification history information and the already-read information to at least one of the second appliance or the terminal device.

3. The notification management device according to claim 1, further comprising:
   a fifth storage that stores already-read information indicating that the notification content of the push notification is marked as read by the user,
   wherein the estimator estimates the interest of the user based on the appliance state information, the setting content information, the voice notification history information, and the already-read information.

4. The notification management device according to claim 1, further comprising:
   a second obtainer that obtains questionnaire information indicating a result of a questionnaire regarding the interest of the user answered by the user,
   wherein the estimator estimates the interest of the user based on the appliance state information, the setting content information, the voice notification history information, and the questionnaire information.

5. The notification management device according to claim 1,
   wherein the estimator estimates the interest of the user by referring to correspondence information indicating a correspondence relationship between the appliance state information, the setting content information, the voice notification history information, and the interest of the user, based on the appliance state information, the setting content information, and the voice notification history information.

6. A notification system comprising:
   a terminal device;
   a first appliance;
   a second appliance; and
   a notification management device that communicates with each of the terminal device, the first appliance, and the second appliance via a network,
   wherein the first appliance includes a first communicator that transmits appliance state information indicating a state of the first appliance operated by a user, to the notification management device,
   the second appliance includes an outputter that outputs a voice notification to the user,
   the notification management device includes:
   an obtainer that obtains the appliance state information from the first appliance;
   a first storage that stores the appliance state information obtained by the obtainer;
   a second storage that stores setting content information indicating setting content of the voice notification of the second appliance set by the user;
   a third storage that stores voice notification history information indicating a history of the voice notification output by the second appliance based on the setting content;
   an estimator that estimates an interest of the user based on at least one of the appliance state information, the setting content information, or the voice notification history information; and
   a notifier that transmits, to the terminal device, a push notification for notifying the user of notification content related to the interest of the user estimated by the estimator, and
   the terminal device includes:
   a second communicator that receives the push notification from the notification management device; and
   a display that displays the push notification received by the second communicator.

7. A control method of a notification management device that communicates, via a network, with each of a terminal device, a first appliance, and a second appliance that outputs a voice notification to a user, the control method comprising:
   (a) obtaining appliance state information indicating a state of the first appliance operated by the user, from the first appliance;
   (b) storing the appliance state information obtained in (a), in a first storage;
   (c) storing setting content information indicating setting content of the voice notification of the second appliance set by the user, in a second storage;
   (d) storing voice notification history information indicating a history of the voice notification output by the second appliance based on the setting content, in a third storage;
   (e) estimating an interest of the user based on at least one of the appliance state information, the setting content information, or the voice notification history information; and (f) transmitting, to the terminal device, a push notification for notifying the user of notification content related to the interest of the user estimated in (e).

8. A non-transitory computer-readable recording medium having recorded thereon a program for causing a computer to execute the control method of a notification management device according to claim 7.

9. A notification management device that communicates, via a network, with each of a terminal device, a first appliance, and a second appliance that outputs a voice notification to a user, the notification management device comprising:
  a first obtainer that obtains appliance state information indicating a state of the first appliance operated by the user, from the first appliance;
  a first storage that stores the appliance state information obtained by the first obtainer;
  a second storage that stores setting content information indicating setting content of the voice notification of the second appliance;
  a third storage that stores voice notification history information indicating a history of the voice notification output by the second appliance based on the setting content;
  an estimator that estimates an interest of the user based on at least one of the appliance state information, the setting content information, or the voice notification history information;
  a selector that determines whether to notify the user of notification content related to the interest of the user estimated by the estimator, and selects a notification method; and
  a notifier that transmits a notification indicating the notification content to at least one of the terminal device or the second appliance by the notification method selected by the selector, when the selector determines to notify the user of the notification content.

10. The notification management device according to claim 9,
  wherein the selector selects, as the notification method, at least one of a push notification transmitted to the terminal device or the voice notification transmitted to the second appliance.

11. The notification management device according to claim 9,
  wherein the selector selects the notification method based on the setting content information and a transmission history of a push notification related to the interest of the user estimated by the estimator.

12. A notification system comprising:
  a terminal device;
  a first appliance;
  a second appliance; and
  a notification management device that communicates with each of the terminal device, the first appliance, and the second appliance via a network,
  wherein the first appliance includes a first communicator that transmits appliance state information indicating a state of the first appliance operated by a user, to the notification management device,
  the second appliance includes an outputter that outputs a voice notification to the user,
  the notification management device includes:
  an obtainer that obtains the appliance state information from the first appliance;
  a first storage that stores the appliance state information obtained by the obtainer;
  a second storage that stores setting content information indicating setting content of the voice notification of the second appliance;
  a third storage that stores voice notification history information indicating a history of the voice notification output by the second appliance based on the setting content;
  an estimator that estimates an interest of the user based on at least one of the appliance state information, the setting content information, or the voice notification history information;
  a selector that determines whether to notify the user of notification content related to the interest of the user estimated by the estimator, and selects a notification method; and
  a notifier that transmits a notification indicating the notification content to at least one of the terminal device or the second appliance by the notification method selected by the selector, when the selector determines to notify the user of the notification content.

13. A control method of a notification management device that communicates, via a network, with each of a terminal device, a first appliance, and a second appliance that outputs a voice notification to a user, the control method comprising:
  (a) obtaining appliance state information indicating a state of the first appliance operated by the user, from the first appliance;
  (b) storing the appliance state information obtained in (a), in a first storage;
  (c) storing setting content information indicating setting content of the voice notification of the second appliance, in a second storage;
  (d) storing voice notification history information indicating a history of the voice notification output by the second appliance based on the setting content, in a third storage;
  (e) estimating an interest of the user based on at least one of the appliance state information, the setting content information, or the voice notification history information;
  (f) determining whether to notify the user of notification content related to the interest of the user estimated in (e), and selecting a notification method; and
  (g) transmitting a notification indicating the notification content to at least one of the terminal device or the second appliance by the notification method selected in (f), when it is determined to notify the user of the notification content in (f).

14. A non-transitory computer-readable recording medium having recorded thereon a program for causing a computer to execute the control method of a notification management device according to claim 13.

* * * * *